(12) United States Patent
Kang et al.

(10) Patent No.: US 12,225,534 B2
(45) Date of Patent: Feb. 11, 2025

(54) METHOD AND DEVICE FOR TRANSMITTING AND RECEIVING SIGNALS IN WIRELESS COMMUNICATION SYSTEM

(71) Applicant: Samsung Electronics Co., Ltd., Gyeonggi-do (KR)

(72) Inventors: Jinkyu Kang, Gyeonggi-do (KR);
Taehyoung Kim, Gyeonggi-do (KR);
Youngbum Kim, Gyeonggi-do (KR);
Jinyoung Oh, Gyeonggi-do (KR);
Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 487 days.

(21) Appl. No.: 17/285,995

(22) PCT Filed: Oct. 14, 2019

(86) PCT No.: PCT/KR2019/013429
§ 371 (c)(1),
(2) Date: Apr. 16, 2021

(87) PCT Pub. No.: WO2020/080768
PCT Pub. Date: Apr. 23, 2020

(65) Prior Publication Data
US 2021/0385809 A1 Dec. 9, 2021

(30) Foreign Application Priority Data
Oct. 19, 2018 (KR) .................. 10-2018-0125419

(51) Int. Cl.
*H04W 72/04* (2023.01)
*H04L 1/18* (2023.01)
(Continued)

(52) U.S. Cl.
CPC ........... *H04W 72/21* (2023.01); *H04L 1/1819* (2013.01); *H04L 1/1896* (2013.01);
(Continued)

(58) Field of Classification Search
CPC ............. H04W 72/21; H04W 72/0446; H04W 72/0453; H04L 1/1819; H04L 1/1896
(Continued)

(56) References Cited

U.S. PATENT DOCUMENTS 11,129,202 B2 9/2021 Lee et al.
2013/0077593 A1 3/2013 Han et al.
(Continued)

FOREIGN PATENT DOCUMENTS

KR 1020130081218 7/2013
WO WO 2018/064582 4/2018
(Continued)

OTHER PUBLICATIONS

U.S. Appl. No. 62/687,986, filed Jun. 21, 2018.*
(Continued)

*Primary Examiner* — Faisal Choudhury
(74) *Attorney, Agent, or Firm* — The Farrell Law Firm, P.C.

(57) ABSTRACT

The disclosure relates to a method and apparatus for transmitting and receiving signals in a wireless communication system. A user equipment (UE) according to an embodiment of the disclosure may receive information about a resource for uplink (UL) control information transmission and MA signature configuration, determine based on the resource for UL control information transmission whether the resource allocated for the UL control information transmission overlaps a resource allocated for UL data transmission, determine whether to multiplex the UL control information when it is determined that the resource allocated for the UL control information transmission overlaps the resource allocated for UL data transmission, and based on a result of the determining, multiplex the UL control information with UL data
(Continued)

based on the information about the MA signature configuration and transmit a result of the multiplexing.

17 Claims, 18 Drawing Sheets

(51) Int. Cl.
 *H04L 1/1812* (2023.01)
 *H04L 1/1867* (2023.01)
 *H04W 72/0446* (2023.01)
 *H04W 72/0453* (2023.01)
 *H04W 72/21* (2023.01)
 *H04L 5/00* (2006.01)

(52) U.S. Cl.
 CPC ... *H04W 72/0446* (2013.01); *H04W 72/0453* (2013.01); *H04L 5/0005* (2013.01)

(58) Field of Classification Search
 USPC ............................................. 370/329
 See application file for complete search history.

(56) References Cited

U.S. PATENT DOCUMENTS

| | | | |
|---|---|---|---|
| 2018/0167933 A1* | 6/2018 | Yin | H04L 5/0053 |
| 2018/0263021 A1 | 9/2018 | He et al. | |
| 2019/0159140 A1* | 5/2019 | Wang | H04L 5/0082 |
| 2019/0356423 A1 | 11/2019 | Lee et al. | |
| 2021/0045181 A1* | 2/2021 | Li | H04L 5/0044 |
| 2021/0100002 A1* | 4/2021 | Pan | H04L 5/0051 |
| 2021/0135825 A1* | 5/2021 | Pan | H04L 5/0037 |
| 2021/0266124 A1* | 8/2021 | Wu | H04W 74/08 |
| 2021/0274531 A1* | 9/2021 | Yamamoto | H04L 5/0044 |
| 2021/0307003 A1* | 9/2021 | Chou | H04L 5/0037 |

FOREIGN PATENT DOCUMENTS

| | | |
|---|---|---|
| WO | WO 2018/128200 | 7/2018 |
| WO | WO 2018/151434 | 8/2018 |

OTHER PUBLICATIONS

ZTE, "Summary of AI 7.2.1.3 on Procedures for NOMA", R1-1809788, 3GPP TSG RAN WG1 Meeting #94, Aug. 20-24, 2018, 6 pages.

Nokia et al., "Procedures to be Considered for NOMA Operation", R1-1811103, 3GPP TSGR AN WG1 Meeting #94bis, Oct. 8-12, 2018, 5 pages.

International Search Report dated Feb. 5, 2020 issued in counterpart application No. PCT/KR2019/013429, 19 pages.

EP Notice of Allowance dated May 22, 2023 issued in counterpart application No. 19873765.2-1206, 81 pages.

Spreadtrum Communications, "Considerations on NOMA Procedures", R1-1806405, 3GPP TSG RAN WG1 Meeting #93, May 21-25, 2018, 3 pages.

European Search Report dated Oct. 15, 2021 issued in counterpart application No. 19873765.2-1205, 10 pages.

ZTE, "Summary of AI 7.2.1.3 on Procedures for NOMA", R1-1811979, 3GPP TSG RAN WG1 Meeting #94b, Oct. 8-12, 2018, 5 pages.

Korean Office Action dated May 14, 2024 issued in counterpart application No. 10-2018-0125419, 8 pages.

* cited by examiner

METHOD AND DEVICE FOR TRANSMITTING AND RECEIVING SIGNALS IN WIRELESS COMMUNICATION SYSTEM

PRIORITY

This application is a National Phase Entry of PCT International Application No. PCT/KR2019/013429, which was filed on Oct. 14, 2019, and claims priority to Korean Patent Application No. 10-2018-0125419, which was filed on Oct. 19, 2018, the entire content of each of which is incorporated herein by reference.

TECHNICAL FIELD

The disclosure proposes a method of transmitting and receiving signals for supporting non-orthogonal multiple access (NOMA) in a wireless communication system.

BACKGROUND ART

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultrahigh frequency (millimeter wave (mm-Wave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value to human life by collecting and analyzing data generated from the things connected, IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be viewed as an example of convergence of 5G and IoT technologies.

With the development of the aforementioned technologies and wireless communication systems, it is possible to provide various services, and there is a need for a method for seamlessly providing the services.

DESCRIPTION OF EMBODIMENTS

Technical Problem

The disclosure proposes a method and apparatus for transmitting and receiving signals for supporting non-orthogonal multiple access (NOMA) in a wireless communication system.

Solution to Problem

The disclosure relates to a method and apparatus for transmitting and receiving signals in a wireless communication system. A user equipment (UE) according to an embodiment of the disclosure may receive information about a resource for uplink control information transmission and MA signature configuration, determine based on the resource for uplink control information transmission whether the resource allocated for the uplink control information transmission overlaps a resource allocated for uplink data transmission, determine whether to multiplex the uplink control information when it is determined that the resource allocated for the uplink control information transmission overlaps the resource allocated for uplink data transmission, and based on a result of the determining, multiplex the uplink control information with uplink data based on the information about MA signature configuration and transmit a result of the multiplexing.

Advantageous Effects of Disclosure

With the method of transmitting and receiving uplink control information as proposed in the disclosure, a resource allocated for transmission of a non-orthogonal multiple access uplink data channel may be efficiently used.

BEST MODE

Figure 1:
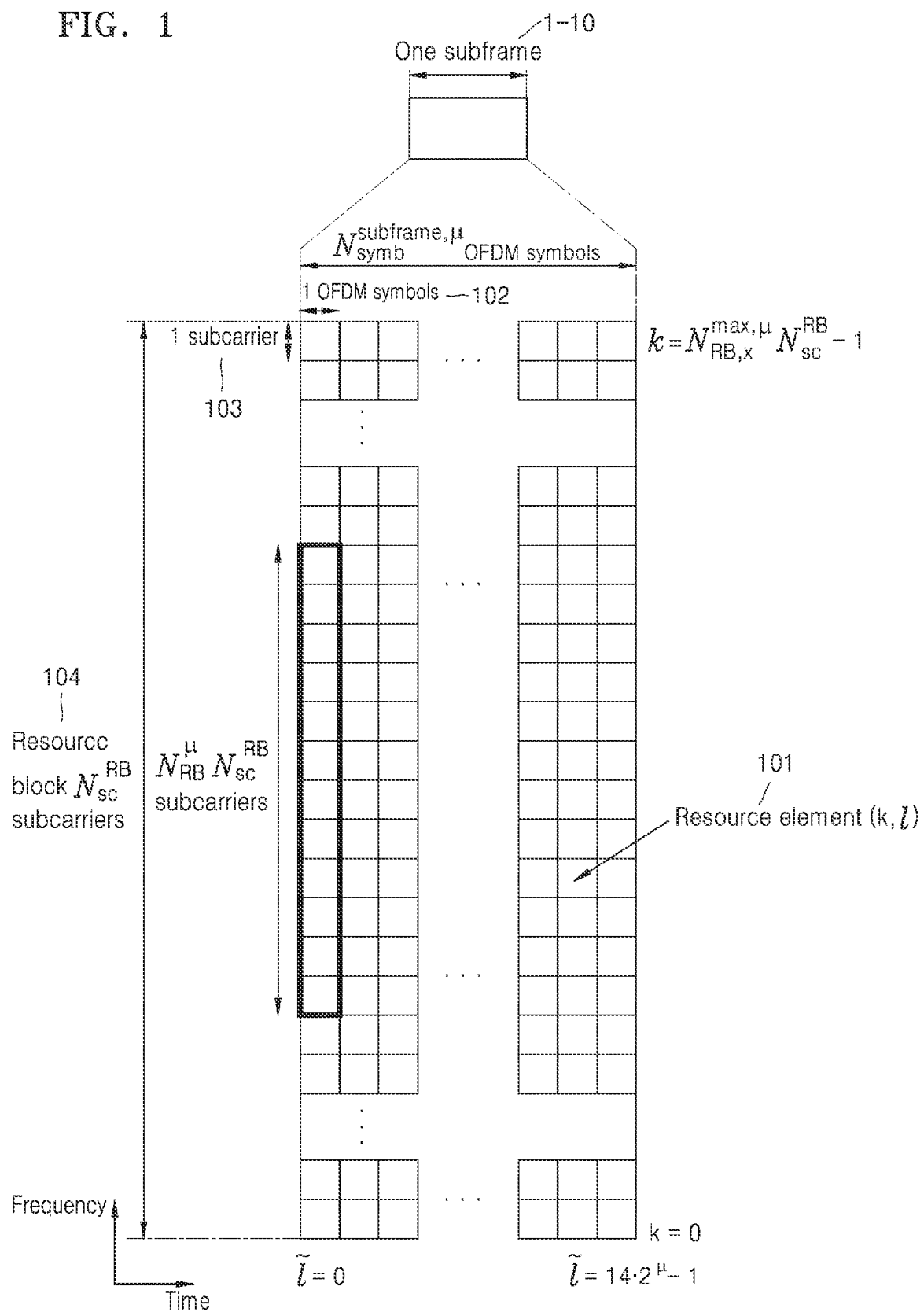
FIG. 1 illustrates a basic structure of the time-frequency domain, which is a radio resource domain in which data or a control channel is transmitted in a 5G system.

According to an embodiment, a method of performing communication by a user equipment (UE) in a wireless communication system includes receiving information about a resource for uplink control information transmission and MA signature configuration; determining based on the resource for uplink control information transmission whether the resource allocated for the uplink control information transmission overlaps a resource allocated for uplink data transmission; determining whether to multiplex uplink control information when it is determined that the resource allocated for the uplink control information transmission overlaps the resource allocated for uplink data transmission; and based on a result of the determining, multiplexing the uplink control information with uplink data based on the information about MA signature configuration and transmitting a result of the multiplexing.

According to an embodiment, a method of performing communication by a base station (BS) in a wireless communication system includes transmitting, to a UE, information about a resource for uplink control information transmission and MA signature configuration; determining whether uplink control information and uplink data received from the UE have been multiplexed by the UE; and decoding at least one of the uplink control information and the uplink data in signals received from the UE, based on a result of the determining.

According to an embodiment, a UE for performing communication in a wireless communication system includes a transceiver; a memory storing one or more instructions; and at least one processor configured to execute the one or more instructions stored in the memory, wherein the at least one processor is configured to execute the one or more instructions to control the transceiver to receive information about a resource for uplink control information transmission and MA signature configuration, determine based on the resource for uplink control information transmission whether the resource allocated for the uplink control information transmission overlaps a resource allocated for uplink data transmission, determine whether to multiplex uplink control information when it is determined that the resource allocated for the uplink control information transmission overlaps the resource allocated for uplink data transmission, and based on a result of the determining, multiplex the uplink control information with uplink data based on the information about MA signature configuration and transmit a result of the multiplexing.

According to an embodiment, a BS for performing communication in a wireless communication system includes a transceiver; a memory storing one or more instructions; and at least one processor configured to execute the one or more instructions stored in the memory, wherein the at least one processor is configured to execute the one or more instructions to control the transceiver to transmit, to a UE, information about a resource for uplink control information transmission and MA signature configuration, determine whether uplink control information and uplink data received from the UE have been multiplexed by the UE, and decode at least one of the uplink control information and the uplink data in signals received from the UE, based on a result of the determining.

MODE OF DISCLOSURE

Embodiments of the disclosure will be described in detail with reference to accompanying drawings.

Technological content well-known in the art or not directly related to the present disclosure is omitted in the following description. Through the omission of content that might otherwise obscure the subject matter of the disclosure, the subject matter will be understood more dearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function, Herein, downlink (DL) refers to a radio transmission path for a signal transmitted from a BS to a UE, and uplink (UL) refers to a radio transmission path for a signal transmitted from a UE to a BS. Although the following embodiments will focus on the long term evolution (LTE) or LTE-Advanced (LTE-A) system as an example, they may be applied to other communication systems with similar technical backgrounds or channel types. For example, the 5th generation (5G) mobile communication technologies developed since the LTE-A, such as the 5G new radio (NR) may be included in the systems to which the embodiments of the disclosure will be applied, and the term '5G' as herein used may be a concept including the existing LTE, LTE-A, or other similar services. Furthermore, embodiments of the disclosure will also be applied to different communication systems with some modifications to such an extent that does not significantly deviate from the scope of the disclosure when determined by skilled people in the art.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts Orthogonal Frequency Division Multiplexing (OFDM) for DL and Single Carrier Frequency Division Multiple Access (SC-FDMA) for UL. The UL refers to a radio link for a UE or MS to transmit data or a control signal to an eNode B or BS, and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby differentiating each user's data or control information.

As a communication system since the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLLC), etc.

The eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system needs to provide increasing user perceived data rate while providing the peak data rate. To satisfy these requirements, enhancement of various technologies for transmission or reception including multiple-input multiple-output (MIMO) transmission technologies may be required. While the LTE uses a maximum of 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of UEs in a cell, enhanced coverage of the UE, extended battery time, reduction in terminal price, etc., are required. Because the IoT is equipped in various sensors and devices to provide communication functions, it may be supposed to support a large number of UEs in a cell (e.g., 1,000,000 terminals/km$^2$). Furthermore, a UE supporting the mMTC is more likely to be located in a shadow area, such as underground of a building, which might not be covered by a cell by the nature of the service, so the mMTC requires an even larger coverage than expected for other services provided by the 5G communication system. The UE supporting the mMTC needs to be a low-cost UE, and requires quite long battery life time such as 10 to 15 years because the battery in the UE is hard to be changed frequently.

Finally, URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLLC services may need to satisfy air interface latency to be less than 0.5 millisecond and simultaneously require a packet error rate equal to or lower than $10^{-5}$. Hence, for the URLLC services, the 5G system needs to provide a smaller transmit time interval (TTI) than for other services, and simultaneously needs to allocate a wide range of resources for a frequency band to secure reliability of the communication link.

Those three services in 5G, eMBB, URLLC, and mMTC may be multiplexed in a single system for transmission. In this case, to meet different requirements for the respective services, different transmission or reception schemes and parameters may be used between the services.

A frame structure in a 5G system will now be described in more detail with reference to the accompanying drawings.

In other words, FIG. 1 illustrates a basic structure of the time-frequency domain, which is a radio resource domain in which data or a control channel is transmitted in a 5G system.

In FIG. 1, the horizontal axis represents a time domain, and the vertical axis represents a frequency domain. A basic resource unit in the time and frequency domain is a resource element (RE) 101, which may be defined as an Orthogonal Frequency Division Multiplexing (OFDM) symbol 102 on the time axis and a subcarrier 103 on the frequency axis. In the frequency domain, $N_{sc}^{RB}$ (e.g., 12) consecutive REs may constitute a single resource block (RB) 104. In the time domain, $N_{symb}^{subframe}$ consecutive OFDM symbols may constitute a single subframe 110.

Figure 2:
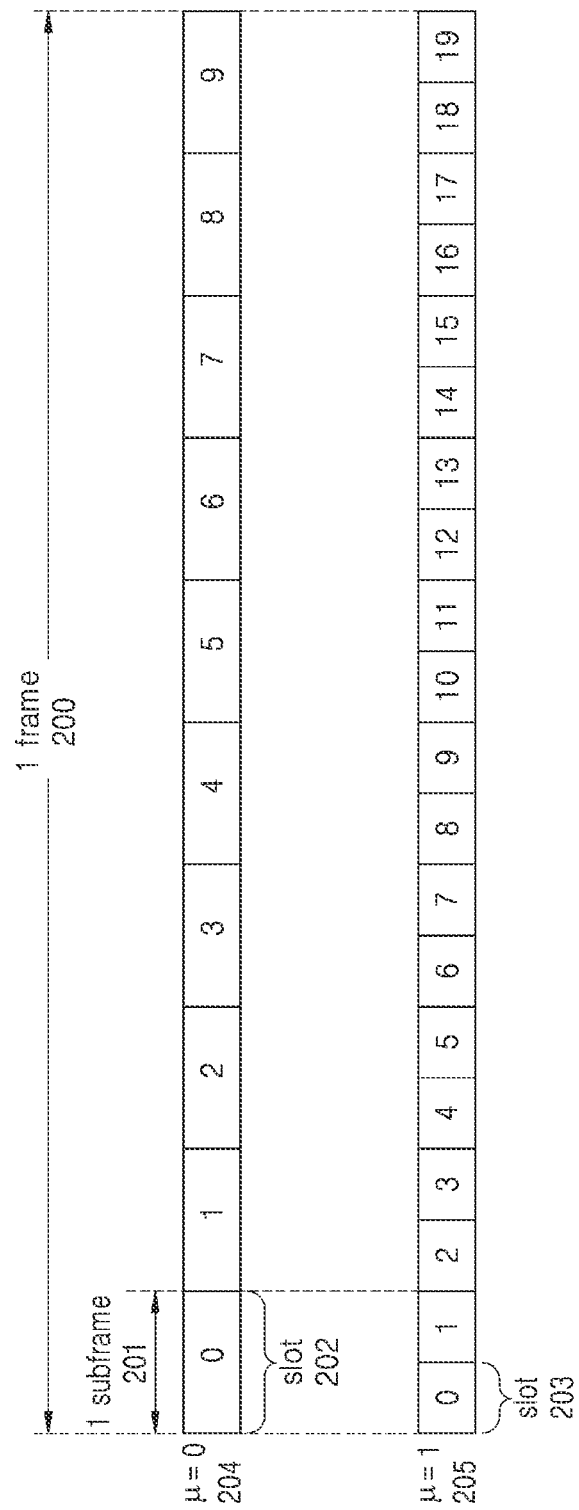
FIG. 2 illustrates a slot structure considered in a 5G system.

FIG. 2 illustrates a slot structure considered in a 5G system.

In FIG. 2, an example of frame 200, subframe 201, and slot 202 structures is shown. The one frame 200 may be defined to be 10 ms long. The 1 subframe 201 may be defined to be 1 ms, and thus a total of 10 subframes 201 may constitute the 1 frame 200. The 1 slot 202 and 203 may be defined to have 14 OFDM symbols (i.e., the number of symbols per 1 slot ($N_{symb}^{slot}$)=14). The one subframe 201 may include one or multiple slots 202 and 203, and the number of slots 202 and 203 per 1 subframe may vary depending on subcarrier spacing configuration values p 204 and 205. In the example of FIG. 2, slot structures are shown in cases of the subcarrier spacing setting values being 0 and 1, i.e., μ=0 (204) and μ=1(205), respectively. In the case of μ=0 (204), the 1 subframe 201 includes 1 slot 202, and in the case of μ=1 (205), the 1 subframe 201 includes 2 slots 203. That is, depending on the subcarrier spacing configuration value μ, the number of slots per 1 subframe ($N_{slot}^{subframe,\mu}$) may vary and the number of slots per 1 frame ($N_{slot}^{frame,\mu}$) may vary accordingly. $N_{slot}^{subframe,\mu}$ and $N_{slot}^{frame,\mu}$ depending on the subcarrier spacing setting value μ may be defined as in the following Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

The downlink control information (DCI) in the 5G system will now be described in detail.

In the 5G system, scheduling information for UL data (or physical uplink shared channel (PUSCH)) or DL data (or physical downlink shared channel (PDSCH)) may be transmitted from the BS to the UE in the DCI. The UE may monitor a fallback DCI format and a non-fallback DCI format for PUSCH or PDSCH. The fallback DCI format may include a fixed field predefined between the BS and the UE, and the non-fallback DCI format may include a configurable field.

The DCI may be transmitted on the physical downlink control channel (PDCCH) after going through channel coding and modulation processes. Cyclic redundancy check (CRC) may be appended to a DCI message payload, and the CRC may be scrambled by a radio network temporary identifier (RNTI) that corresponds to an ID of the UE. Depending on the use of the DCI message, e.g., UE specific data transmission, power control command, random access response, or the like, different RNTIs may be used. In other words, the RNTI may be transmitted not explicitly but in a CRC calculation process. On reception of a DCI message transmitted on the PDCCH, the UE may check CRC using an allocated RNTI, and determine that the DCI message is transmitted to the UE when the CRC check result is correct.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules PUSCH, in which case the CRC may be scrambled by C-RNTI. The DCI format 0_0 with the CRC scrambled by the C-RNTI may include e.g., the following information.

TABLE 2

Identifier for DCI formats - [1] bit
Frequency domain resource assignment -
[[log$_2$($N_{RB}^{UL,BWP}$($N_{RB}^{UL,BWP}$ + 1)/2)]] bits
Time domian resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit DCI format 0_1 may be used for the non-fallback DCI that schedules the PUSCH, in which case the CRC may be scrambled by a C-RNTI. The DCI format 0_1 with the CRC scrambled by the C-RNTI may include e.g., the following information.

TABLE 3

Carrier indicator-0 or 3 bits
UL/SUL indicator-0 or 1 bit
Identifier for DCI formats-[1] bits
Bandwidth part indicator-0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}UL,BWP + 1)/2) \rceil$ bits
Time domain resource assignment-1, 2, 3, or 4 bits
VRB-to-PRB mapping-0 or 1 bit, only for resource allocation type 1.
0 bit if only resource allocation type 0 is configured;
1 bit otherwise.
Frequency hopping flag-0 or 1 bit, only for resource allocation type 1.
0 bit if only resource allocation type 0 is configured;
1 bit otherwise.
Modulation and coding scheme-5 bits
New data indicator-1 bit
Redundancy version-2 bits
HARQ process number-4 bits
1st downlink assignment index-1 or 2 bits
1 bit for semi-static HARQ-ACK codebook;
2 bits for dynamic HARQ-ACK codebook with single HARQ-ACK codebook.
2nd downlink assignment index-0 or 2 bits
2 bits for dynamic HARQ-ACK codebook with two HARQ-ACK sub-codebooks;
0 bit otherwise.
TPC command for scheduled PUSCH-2 bits SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission;

$\lceil \log_2(N_{SRS}) \rceil$ bits for codebook based PUSCH transmission.
Precoding information and number of layers-up to 6 bits
Antenna ports-up to 5 bits
SRS request-2 bits
CSI request-0, 1, 2, 3, 4, 5, or 6 bits
CBG transmission information-0, 2, 4, 6, or 8 bits
PTRS-DMRS association-0 or 2 bits.
beta_offset indicator-0 or 2 bits
DMRS sequence initialization-0 or 1 bit DCI format 1_0 may be used for the fallback DCI that schedules PDSCH, in which case the CRC may be scrambled by C-RNTI. The DCI format 1_0 with the CRC scrambled by the C-RNTI may include e.g., the following information.

TABLE 4

Identifier for DCI formats - [1] bit
Frequency domain resource assignment -$\lceil \log_2(N_{RB}^{DL,BWP}(N_{RB}^{DL,BWP} + 1)/2) \rceil$ bits
Time domian resource assignment - X bits
VRB-toPRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used for the non-fallback DCI that schedules PDSCH, in which case the CRC may be scrambled by C-RNTI. The DCI format 1_1 with the CRC scrambled by the C-RNTI may include e.g., the following information.

TABLE 5

Carrier indicator - 0 or 3 bits
Identifier for DCI formats - [1] bit

TABLE 5-continued

Bandwidth part indicator - 0, 1 or 2 bits
Frquency domain resource assignment
For resource allocation type 0, $\lceil N_{RB}^{DL,BWP}/P \rceil$ bits
For resource allocation tpye 1, $\lceil \log_2(N_{RB}^{DL,BWP}(N_{RB}^{DL,BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise
PRB bundling size indicator - 0 or 1 bit
Rate matching indicator - 0, 1, or 2 bits
ZP CSI-RS trigger - 0, 1, or 2 bits
For transport block 1
Modulation and coding scheme - 5 bits
New data indicator - 1 bit
Redundancy version - 2 bits
For transport block 2
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indicate - 0 or 3 bits
SRS request - 2 bits
CBG transmission information - 0, 2, 4, 6, or 8 bits
CBS flushing out information - 0 or 1 bit
DMRS sequence initialization - 1 bit A physical uplink control channel (PUCCH) in the 5G system will now be described in detail with reference to accompanying drawings.

Figure 3:
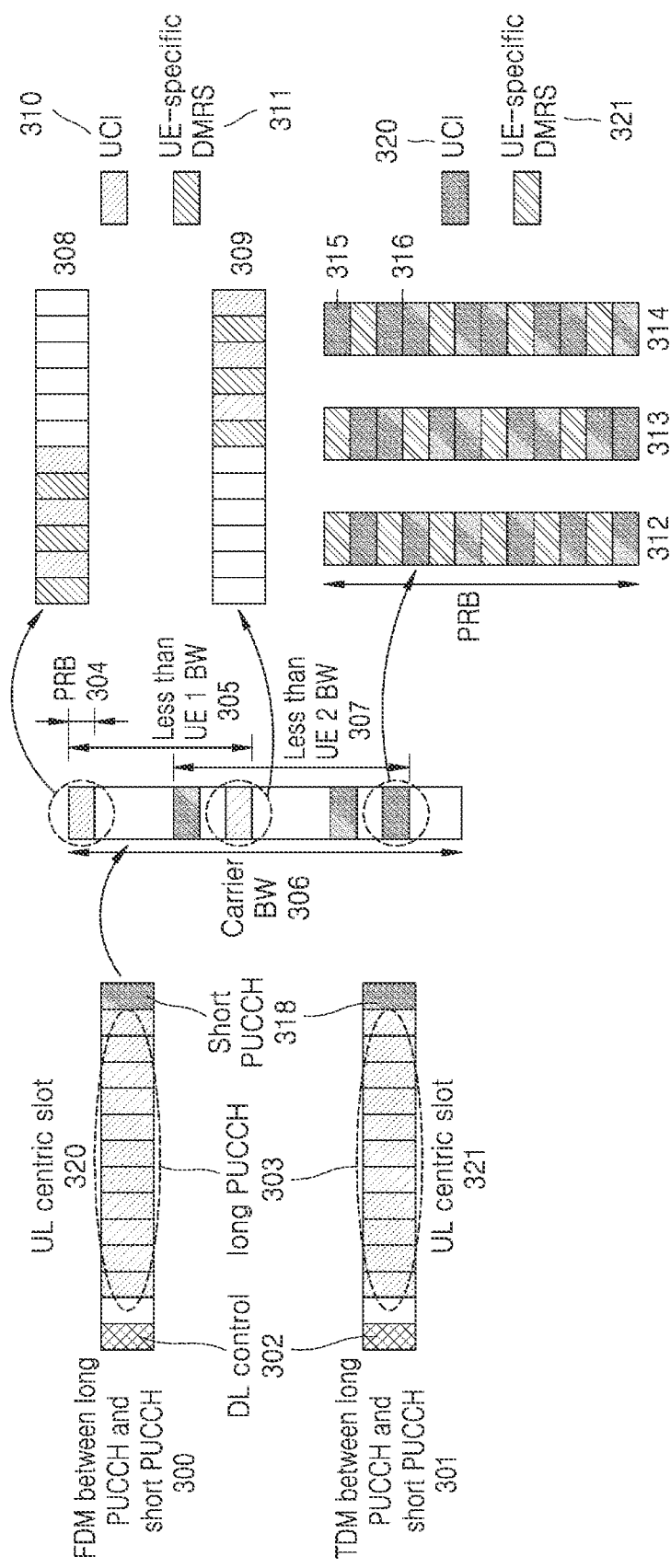
FIG. 3 is a diagram for describing a structure of an uplink control channel in a 5G system.

FIG. 3 is a diagram for describing a structure of an UL control channel in a 5G system.

In FIG. 3, a method in which a UE transmits a UL control channel by determining a transmission interval (or a start symbol and an end symbol) of a long PUCCH or a short PUCCH on a slot basis is described. It is not, however, limited thereto, and the transmission method may be equally applied to an occasion when a UE transmits a UL control channel by determining a transmission interval (or a start symbol and an end symbol) of a long PUCCH or a short PUCCH on a mini-slot basis.

In FIG. 3, how a long PUCCH and a short PUCCH are multiplexed in the frequency domain (FDM) 300 or in the time domain (TDM) 301 is shown. Firstly, a slot structure in which a long PUCCH and a short PUCCH are multiplexed in FIG. 3 will be described. 320 and 321 represent UL centric slots in which UL is primarily used in slots (various terms such as subframes or transmission time intervals (TTIs) may be used. And in the disclosure, the basic transmission unit is termed a slot) which are basic transmission units in 5G. This is an occasion when the UL centric slot has OFDM symbols, most of which are used for a UL, and in this case all the OFDM symbols may be used for UL transmission or the first few or the last few OFDM symbols may be used for DL transmission. In a case that both DL and UL are present in a slot, there may be a transmission gap between the DL and the UL. In FIG. 3, in a slot, the first OFDM symbol is used for DL transmission, e.g., DL control channel transmission 302, and OFDM symbols from the third OFDM symbol are used for UL transmission. The second OFDM symbol is used as the transmission gap. In the UL transmission, UL data channel transmission and UL control channel transmission are possible.

Next, the long PUCCH 303 will be described. As a control channel having a long transmission period is used to enlarge cell coverage, it may be transmitted in a discrete Fourier transform (DFT) spread (S) OFDM (DFT-S-OFDM) method, which is a single carrier transmission rather than an OFDM transmission, Hence, the transmission is to be performed only using successive subcarriers, and for gaining frequency diversity effects, an uplink control channel having a long transmission period may be configured at separated positions such as in 308 and 309. A separation distance in frequency 305 needs to be less than the bandwidth supported by the UE, in which case transmission is performed using PRB-1 as in 308 in a front portion of the slot while transmission is performed using PRB-2 as in 309 in a rear portion of the slot. Here, a PRB is a physical resource block referring to a minimum transmission unit in frequency, and may be defined with e.g., 12 subcarriers. Accordingly, frequency ranges of the PRB-1 and PRB-2 need to be less than a maximum bandwidth supported by the UE, and the maximum bandwidth supported by the UE may be equal to or less than bandwidth 306 supported by the system. The frequency resources PRB-1 and PRB-2 may be configured for the UE by a higher layer signal, in which case, the frequency resources are mapped by the higher layer signal to a bit field, and which frequency resources may be used may be indicated by the bit field included in a downlink control channel to the UE. Furthermore, the control channel transmitted in the front portion of the slot in 308 and the control channel transmitted in the rear portion of the slot in 309 are each configured with UL control information (UCI) 310 and a UE reference signal 311, and the two signals are assumed to be separated in time and transmitted in different OFDM symbols.

The UE may be configured with PUCCH transmission resources, i.e., PUCCH resource sets, by a higher layer signal. The UE may select the configured PUCCH resource sets according to the number of control information bits. In a particular slot, the UE may select PUCCH resource set 0 when the number of control information bits to be transmitted is 1 to 2, PUCCH resource set 1 when the number of control information bits to be transmitted is 3 to N2-1, PUCCH resource set 2 when the number of control information bits to be transmitted is N2 to N3-1, and PUCCH resource set 3 when the number of control information bits to be transmitted is N3 or N4-1. N2, N3, and N4 may all be received beforehand by the UE from a BS through a higher layer signal. Each PUCCH resource set may include X PUCCH resources, and the X PUCCH resources may include resources for short PUCCHs (PUCCH format 0, or PUCCH format 2), or resources for long PUCCHs (PUCCH format 1, PUCCH format 3, or PUCCH format 4).

Which one of the X resources is to be selected by the UE and a PUCCH format corresponding to the selected resource to be transmitted by the UE may be indicated in bits of a DL control channel, or may be derived from a transmission resource or slot index of the DL control channel, a UE-specific identifier (ID), etc. In another example, which one of the X resources is to be selected by the UE and a PUCCH format corresponding to the selected resource to be transmitted by the UE may be indicated to the UE in a combination of the indication by a DL control channel and the method of derivation from a transmission resource or slot index of the DL control channel, a UE-specific identifier, etc.

For example, when the number of control information bits to be transmitted by the UE is 1 or 2, the PUCCH resource set 0 may include at least 8 PUCCH resources, and may be configured by a higher layer signal to include a maximum of 32 PUCCH resources, (In this case, X of the PUCCH resource set 0 may be equal to or greater than 8 and equal to or less than 32, i.e., 8≤X≤32). The number of the PUCCH resources may be set by a higher layer signal. When the number of control information bits is greater than 2, the PUCCH resource sets 1, 2, and 3 may always include 8 PUCCH resources. In this case, when the number of control information bits to be transmitted by the UE is 1 or 2, which PUCCH format to be used by the UE to transmit control information in what PUCCH resource may be indicated to the UE in the combination of the indication by a DL control channel and the method of derivation from a transmission resource or slot index of the DL control channel, a UE-specific identifier, etc. In this case, when the number of PCCH resources of the PUCCH resource set 0 is only 8, the UE may receive an indication of the PUCCH resources only by means of a particular 3-bit field of the DL control channel. When the number of PUCCH resources of the PUCCH resource set 0 configured for the UE exceeds 8, the UE may take into account each or combinations of parameters such as a transmission resource or slot index of a DL control channel or a DL data channel, a UE-specific ID or configuration ID from a plurality of PUCCH resources (or an index of a subset including a plurality of PUCCH resources in the PUCCH resource set 0) using the particular 3-bit field of the DL control channel. For example, the following equation may be considered.

$$r_{PUCCH} = \begin{cases} \left\lfloor \frac{n_{CCE,p} \cdot \lfloor R_{PUCCH}/8 \rfloor}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lceil \frac{R_{PUCCH}}{8} \right\rceil + \Delta R_{PUCCH} \bmod 8 & \text{if } \Delta_{PRI} \geq R_{PUCCH} \bmod 8 \end{cases} \quad \text{[Equation 1]}$$

Where $R_{PUCCH}$ denotes the number of PUCCH resources of the PUCCH resource set 0 configured for the UE, $n_{CCE,p}$ denotes a start CCE index of a decoded PDCCH in a CORESET configured for the UE by a higher layer signal, $N_{CCE,p}$ denotes the number of CCEs in the CORESET configured for the UE by the higher layer signal, and $\Delta_{PRI}$ denotes a value indicated using a particular 3-bit field of the PDCCH. Furthermore, $r_{PUCCH}$ denotes a PDCCH resource.

In the above equation 1, the UE may derive a PUCCH resource from a PDCCH corresponding to PUCCH transmission, and transmit a PUCCH format in the PUCCH resource. Here, the expression "PDCCH corresponding to PUCCH transmission" refers to a relation between a PDCCH and a PUCCH when DL data is scheduled in the PDCCH, the DL data is received, and the PUCCH is transmitted in relation to the DL data.

When the number of control information bits to be transmitted by the UE is greater than 2, which PUCCH format to be used by the UE to transmit control information in what PUCCH resource may be indicated to the UE by indication in a particular 3-bit field of the IX control channel (In this case, X of the PUCCH resource set 1, 2, or 3 may be equal to 8, i.e., X=8).

The UE may receive or derive an indication scheme to select one of the X PUCCH resources and transmit control information in a corresponding PUCCH format. The PUCCH resource indication scheme may be applied as long as the UE may be able to determine a PUCCH resource through reception of a corresponding DL control channel before transmission of HARQ-ACK, as in HARQ-ACK transmission. As in CSI or SR transmission, when the UE has not received any corresponding control channel before CSI or SR, the UE may receive, from the BS, a PUCCH format to be used in the CSI or SR transmission and a PUCCH resource required by a higher layer signal in advance. The UE may transmit the CSI or SR using the configured PUCCH format in the configured PUCCH resource in a slot for CSI or SR transmission according to periodicity and offset configured by a higher layer signal from the BS.

A PUCCH resource corresponding to a PUCCH format may include at least one piece of the following information:

a PUCCH transmission start symbol, the number of PUCCH transmission symbols an index indicating a start PRB, the number of transmission PRBs, whether to configure frequency hopping, a frequency resource of a second hop when the frequency hopping is indicated an initial CS value, an index of an orthogonal cover code (OCC) on the time axis, a length of pre-DFT OCC, an index of the pre-DFT OCC Ranges of information and values required depending on the respective PUCCH formats are represented in the following table. In the following table, when no range of values is required because there is no need to set a value or a value is 1, this will be denoted as N.A.

method and a grant-free (or configured grant, or configured scheduling) based transmission method.

In the grant based PUSCH transmission method, when traffic to be transmitted to the BS occurs, the UE may transmit a scheduling request message to the BS on a UL control channel (e.g., physical uplink control channel). Upon reception of the scheduling request message, the BS may transmit UL scheduling DCI corresponding to a scheduling grant to the UE. The UE may receive the UL scheduling DCI by monitoring a PDCCH, and transmit a PUSCH to the BS based on control information notified in the DCI.

In the grant-free based PUSCH transmission method, the BS may first configure the UE with a semi-static time/frequency resource by higher layer signaling (e.g., radio resource control (RRC) signaling). The UE may directly transmit a PUSCH in the configured time/frequency resource without a grant from the BS when traffic to be transmitted to the BS occurs. The grant-free based transmission method will be described later in detail.

Next, a transmission structure for transmitting a UL data channel (e.g., a PUSCH) in 5G will now be described.

Figure 4:
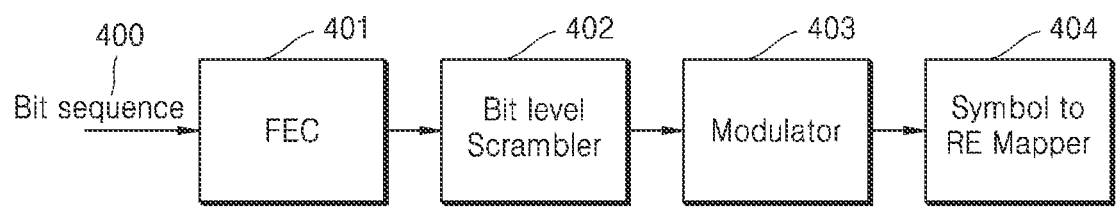
FIG. 4 is a diagram for describing a structure of a transmitting end for transmitting an uplink data channel in 5G.

FIG. 4 is a diagram for describing a structure of a transmitting end for transmitting a UL data channel in 5G. In FIG. 4, an end for transmitting a PUSCH may include a forward error correction (FEC) block 401, a bit-level scram-

TABLE 6

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1.2 | 4-14 | 1.2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling a FH | Configurability | √ | √ | √ | √ | √ |
| | Value range | On/Off (only for 2 symbol) | On/Off | On/Off (only for 2 symbol) | On/Off | On/Off |
| Freq.cy resource of 2$^{nd}$ hop if FM is enabled | Configurability | √ | √ | √ | √ | √ |
| | Value range | 0-274 | 0-274 | 0-274 | 0-274 | 0-274 |
| Index of initial cyclic shift | Configurability | √ | √ | N.A. | N.A. | N.A. |
| | Value range | 0-11 | 0-11 | N.A. | 0-11 | 0-11 |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

In the disclosure, hereinafter, a short PUCCH refers to the PUCCH format 0 or the PUCCH format 2 unless otherwise specified, and a long PUCCH refers to the PUCCH format 1, the PUCCH format 3, or the PUCCH format 4 unless otherwise specified. Furthermore, in the disclosure, transmitting in a PUCCH format X means transmission is performed using a PUCCH resource for the PUCCH format X obtained in the method of the disclosure e.g., by being indicated from the BS or induced, unless otherwise specified.

Next, a method of transmitting a UL data channel (e.g., PUSCH) in 5G will be described in detail.

A method of transmitting a PUSCH from a UE to a BS may be classified largely into a grant based transmission bler 402, a modulator 403, and an RE mapper 404. The FEC block 401 may serve to perform channel coding on an input bit sequence 400. The FEC block 401 may also serve to repeat the input bit sequence.

The bit-level scrambler 402 may perform a scrambling operation on a total of M-bit bit sequence $b^{(q)}(0), \ldots, b^{(q)}(M_{bit}^{(q)}-1)$ output through the FEC block 401. For example, the bit-level scrambler 402 may follow the following procedure. The bit sequence $b^{(q)}(0), \ldots, b^{(q)}(M_{bit}^{(q)}-1)$ may be scrambled before modulation, and as a result, scrambled bits $\tilde{b}^{(q)}(0), \ldots \tilde{b}^{(q)}(M_{bit}^{(q)}-1)$ may be obtained, $M_{bit}^{(q)}$ refers to the number of bits in a codeword q.

TABLE 7

The block of bits $b^{(q)}(0), \ldots, b^{(q)}(M^{(q)} - 1)$, where $M_{bit}^{(q)}$ is the number of bits in codeword q transmitted on the physical channel, shall be scrambled prior to modulation, resulting in a block of scrambled bits $\tilde{b}^{(q)}(0), \ldots, \tilde{b}(q)(M_{bit}^{(q)} - 1)$ according to the following pseudo code Set i = 0
while i < $M_{bit}^{(q)}$
  if $b^{(q)}(i)$ = x // UCI placeholder bits
    $\tilde{b}^{(q)}(i)$ = 1
  else
    if $b^{(q)}(i)$ = y // UCI placeholder bits
      $\tilde{b}^{(q)}(i) = \tilde{b}^{(q)}(i - 1)$
    else
      $\tilde{b}^{(q)}(i) = (b^{(q)}(i) + c^{(q)}(i))$ mod 2
    end if
  end if
        i = i + 1
end while
where x and y are tags defined in [4, TS 38.212] and where the scrambling sequence $c^{(q)}(i)$ is given by clause 5.2.1. The scrambling sequence generator shall be initialized with $c_{init} = n_{RNTI} \cdot 2^{15} + n_{ID}$ where
$n_{ID} \in \{0, 1, \ldots, 1023\}$ equals the higher-layer parameter dataScramblingIdentityPUSCHData-scrambling-Identity if configured and the RNTI equals the C-RNTI or CS-RNTI,
$n_{ID} = N_{ID}^{cell}$ otherwise
and where $n_{RNTI}$ corresponds to the RNTI associated with the PUSCH transmission as described in clause 6.1 of [6, TS 38.214].

The bit sequence $\tilde{b}^{(q)}(0), \ldots \tilde{b}^{(q)}(M_{bit}^{(q)}-1)$ that has undergone the bit-level scrambler 402 may be output as Msymb modulated symbol sequences $d^{(q)}(0), \ldots, d^{(q)}(M_{symb}^{(q)}-1)$ through the modulator 403. 5G supports a modulation scheme based on the following modulation order.

TABLE 8

| Transform precoding disabled | | Transform precoding enabled | |
|---|---|---|---|
| Modulation scheme | Modulation order $Q_m$ | Modulation scheme | Modulation order $Q_m$ |
|  |  | π/2 · BPSK | 1 |
| QPSK | 2 | QPSK | 2 |
| 16QAM | 4 | 16QAM | 4 |
| 64QAM | 6 | 64QAM | 6 |
| 256QAM | 8 | 256QAM | 8 |

The modulated symbol sequences $d^{(q)}(0), \ldots, d^{(q)}(M_{symb}^{(q)}-1)$ that has undergone the modulator 403 may be mapped to time and frequency resources through the symbol-to-RE mapping block 404 and a result of the mapping may be transmitted.

According to the following table 9, for each of antenna ports used for transmission of a PUSCH, to tune transmission power to [5, TS 38.213], a block $z^{(p)}(0), \ldots, z^{(p)}(M_{symb}^{ap}-1)$ of symbols of complex values may be multiplied by a size scaling factor $\beta_{PUSCH}$. Furthermore, for transmission that satisfies the following conditions, $z^{(p)}(0), \ldots, z^{(p)}(M_{symb}^{ap}-1)$ may be sequentially mapped to resource elements $(k', 1)_{p,\mu}$ of a virtual resource block by starting with $z^{(p)}(0)$. In this regard, the conditions are as follows: 1) they need to be included in the virtual resource block for transmission, and 2) resource elements corresponding to a corresponding physical resource block are not used for transmission of DMRS, PT-RS or a DMRS for another simultaneously scheduled UE.

TABLE 9

For each of the antenna ports used for transmission of the PUSCH, the block of complex-valued symbols $z^{(p)}(0), \ldots, z^{(p)}(M_{symb}^{ap} - 1)$ shall be multiplied with the amplitude scaling factor $\beta_{PUSCH}$ in order to conform
to the transmit power specified in [5, TS 38.213] and mapped in sequence with $z^{(p)}(0)$ to resource elements $(k', 1)_{p,\mu}$ in the virtual resource blocks assigned for transmission which meet all the following criteria:
they are in the virtual resource blocks assigned for transmission, and
the corresponding resource elements in the corresponding physical resource blocks are not used for transmission of the associated DM-RS, PT-RS, or DM-RS intended for other co-scheduled UEs as described in clause 6.4.1.1.3
The mapping to resource elements $(k', 1)_{p,\mu}$ allocated for PUSCH according to [6, TS 38.214] shall be in increasing order of first the index k' over the assigned virtual resource blocks, where k' = 0 is the first subcarrier in the lowest-numbered virtual resource block assigned for transmission, and then the index l, with the starting position given by [6, TS 38.214]

Figure 5:
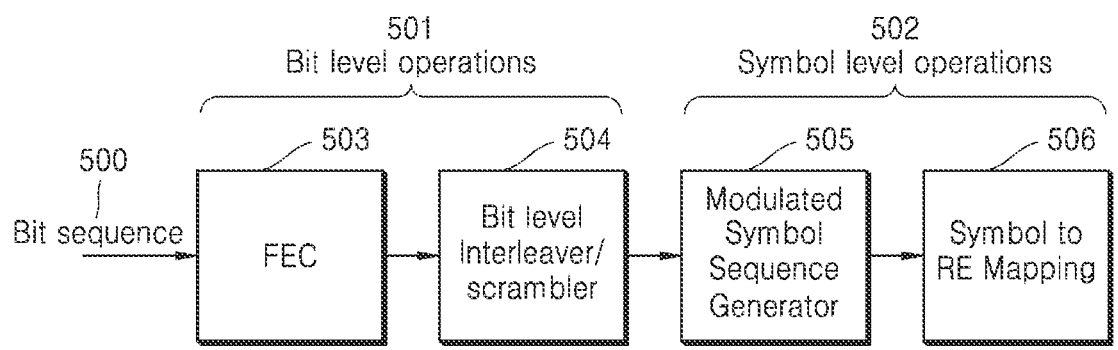
FIG. 5 illustrates a structure of a transmitting end in a non-orthogonal multiple access (NOMA) mode in 5G.

A transmission structure for NOMA based PUSCH transmission in 5G will now be described. FIG. 5 illustrates a structure of a transmitting end in a (NOMA mode in 5G.

In FIG. 5, operations performed at the transmitting end for NOMA may include bit-level operations 501 and symbol-level operations 502.

Devices for performing the bit-level operations 501 may include an FEC block 503 and a bit-level interleaver/scrambler 504. The FEC block 503 may serve to perform channel coding on an input bit sequence 500. It may also repeat the input bit sequence. The bit-level interleaver/scrambler 504 may perform interleaving and scrambling operations on bits output through the FEC block 503. An interleaver/scrambler to be used in the bit-level interleaver/scrambler block 504 may be cell-specific or UE-specific, to randomize interference to other UEs transmitting signals using the same time and frequency resources.

Devices for performing the symbol-level operations 502 may include a modulated symbol sequence generator 505 and a symbol-to-RE mapping block 506. The modulated symbol sequence generator 505 and the symbol-to-RE mapping block 506 may have functions of single- or multi-tone modulation, UE-specific symbol spreading (through repetition), cell- and/or UE-specific symbol-level interleaving/scrambling, sparse or non-sparse resource mapping, transmission power control, etc.

Such a structure of the transmitting end for NOMA is not limited to the structure shown in FIG. 5, and the operations may be performed by other structures.

UEs operating in NOMA may modulate UL data to be transmitted based on the transmission structure of FIG. 5 and transmit a result of the modulating to the BS. In this case, multiple UEs performing NOMA may simultaneously transmit their PUSCHs in the same time and frequency resources. Hence, the PUSCHs of the multiple UEs may interfere with each other. However, because each of the UEs may receive an MA signature ID directly from the BS or indirectly estimate the MA signature ID through a UE-specific identifier (e.g., a UE ID, a scrambling ID, an ID additionally configured by the BS, etc.), the BS that has received PUSCHs of the multiple UEs may use a receiver that takes into account the aforementioned transmission structure to restore UL data of each UE based on an MA signature ID used by the UE (in the grant-free based transmission, the BS may estimate what is transmitted by a certain UE through the MA signature ID).

Next, a structure of a receiving end for UL NOMA being considered in 5G will be described in detail. The NOMA refers to a technology to provide communication services to multiple UEs in the same time and frequency resources. For example, multiple UEs may transmit UL data channels in the same time and frequency resources.

Figure 6:
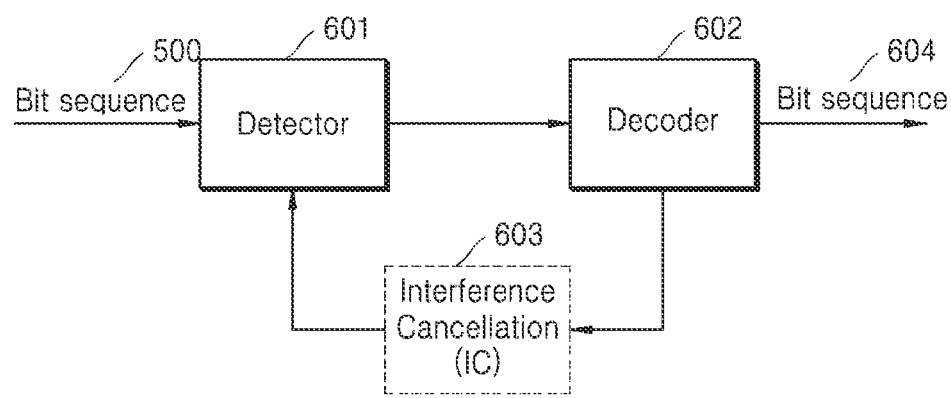
FIG. 6 is a diagram for describing a structure of a receiving end for NOMA discussed in 5G.

FIG. 6 is a diagram for describing a structure of a receiving end for NOMA being discussed in 5G.

In FIG. 6, a receiving end for NOMA may include a detector 601, a decoder 602, and an interference cancellation block 603.

A signal 600 received by a receiver may undergo the detector 601, where signal distortion due to a channel may be compensated. An output signal that has undergone the detector 601 may be input to the decoder 602 to be subject to a decoding process for channel coding. The output signal that has undergone the decoder 602 may go to the interference cancellation block 603 to undergo an interference cancellation operation. The interference cancellation operation may include various signal processing techniques for the purpose of e.g., canceling signal interferences between users in NOMA. The output value that has undergone the interference cancellation block 603 may be input back to the decoder 601, and the aforementioned procedure may be repeatedly performed. After the aforementioned procedure is performed repeatedly, the NOMA receiver may output bit sequences 604 as a final output value.

The grant-free based transmission method in 5G will now be described.

Figure 7:
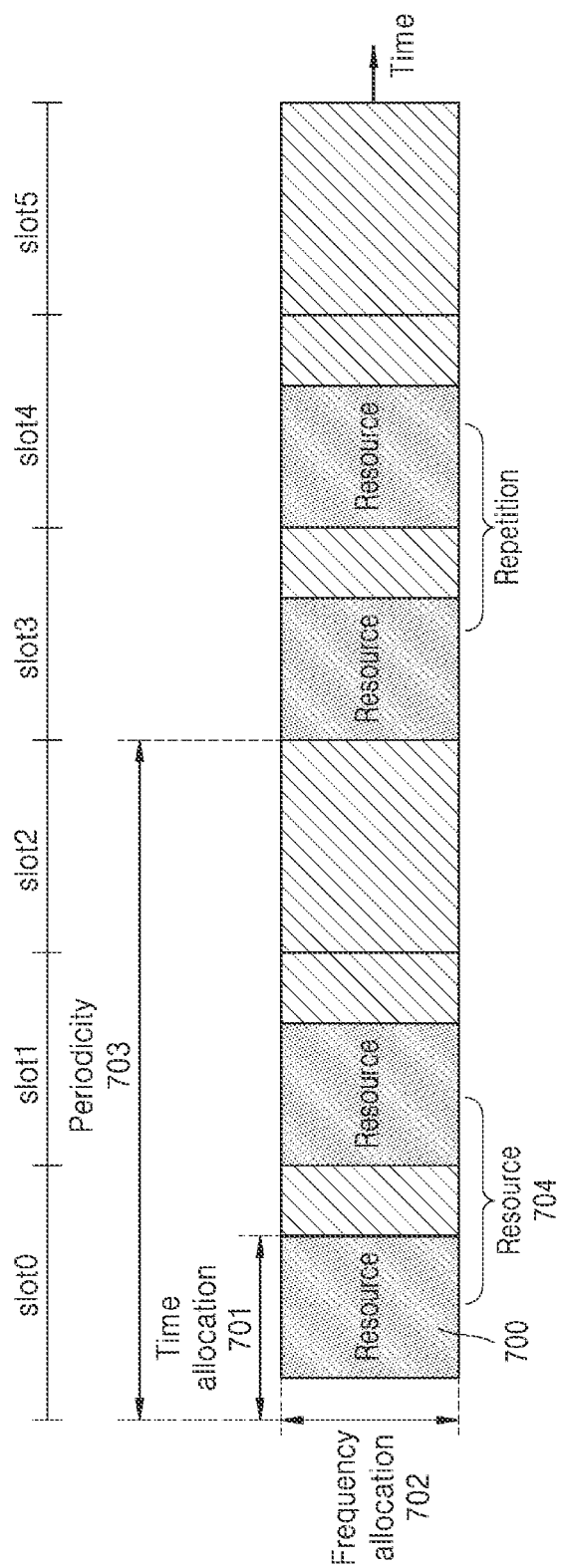
FIG. 7 is a diagram for describing an example of a grant-free based transmission method in 5G.

FIG. 7 is a diagram for describing an example of the grant-free based transmission method in 5G.

For the grant-free (or called configuration grant) based transmission method for a UL data channel (e.g., PUSCH), 5G supports two types: grant-free based PUSCH transmission type 1 (or type-1 PUSCH transmission with a configured grant), and grant-free based PUSCH transmission type 2 (or type-2 PUSCH transmission with a configured grant).

[Grant-free based PUSCH transmission type 1]

In the grant-free based PUSCH transmission type 1, the BS may configure the UE with particular time/frequency resources 700 that allow grant-free based PUSCH transmission through higher layer signaling, e.g., RRC signaling. For example, as shown in FIG. 7, time domain allocation information 701, frequency domain allocation information 702, periodicity information 703, etc., for the resources 700 may be configured by RRC signaling. Furthermore, the BS may configure the UE with various parameters for PUSCH transmission (e.g., frequency hopping, DMRS configuration, an MCS table, an MCS, a resource block group (RBG) size, the number of repeated transmission times, a redundancy version (RV), etc.) via higher layer signaling. Specifically, configuration information in Table 10 may be included.

TABLE 10

| ConfiguredGrantConfig ::= | SEQUENCE { |
|---|---|
| frequencyHopping | ENUMERATED {mode1, mode2} |
| OPTIONAL, -- Need S, | |
| cg-DMRS-Configuration | DMRS-UplinkConfig, |
| mcs-Table | ENUMERATED {qam256, spare1} |
| OPTIONAL, -- Need S | |
| mcs-TableTransformPrecoder | ENUMERATED {qam256, spare1} |
| OPTIONAL, -- Need S | |
| uci-OnPUSCH | SetupRelease { CG-UCI-OnPUSCH } , |
| resourceAllocation | ENUMERATED { resourceAllocationType0, |
| resourceAllocationType1, dynamicSwitch }, | |
| rbg-Size | ENUMERATED {config2} |
| OPTIONAL, -- Need S | |
| powerControlLoopToUse | ENUMERATED {n0, n1}, |
| p0-PUSCH-Alpha | P0-PUSCH-AlphaSetId, |
| transformPrecoder | ENUMERATED {enabled} |
| OPTIONAL, -- Need S | |

TABLE 10-continued

```
nrofHARQ-Processes              INTEGER (1 . . . 16) ,
repK                            ENUMERATED {n1, n2, n4, n8},
repK-RV                         ENUMERATED {s1-0231, s2-0303, s3-0000}
            OPTIONAL, -- Cond RepK
periodicity                     ENUMERATED {
                                sym2, sym7, sym1x14, sym2x14, sym4x14,
sym5x14, sym8x14, sym10x14, sym16x14, sym20x14,
                                sym32x14, sym40x14, sym64x14, sym80x14,
sym128x14, sym160x14, sym256x14, sym320x14, sym512x14,
                                sym640x14, sym1024x14, sym1280x14,
sym2560x14, sym5120x14,
                                sym6, sym1x12, sym2x12, sym4x12,
sym5x12, sym8x12, sym10x12, sym16x12, sym20x12, sym32x12,
                                sym40x12, sym64x12, sym80x12, sym128x12,
sym160x12, sym256x12, sym320x12, sym512x12, sym640x12,
                                sym1280x12, sym2560x12
                                },
configuredGrantTimer            INTEGER (1 . . . 64)
            OPTIONAL, -- Need R
rrc-ConfiguredUplinkGrant       SEQUENCE {
    timeDomainOffset            INTEGER (0 . . . 5119) ,
    timeDomainAllocation        INTEGER (0 . . . 15) ,
    frequencyDomainAllocation   BIT STRING (SIZE(18)),
    antennaPort                 INTEGER (0 . . . 31) ,
    dmrs-SeqInitialization      INTEGER (0 . . . 1)
            OPTIONAL, -- Cond NoTransformPrecoder
    precodingAndNumberOfLayers  INTEGER (0 . . . 63),
    srs-ResourceIndicator       INTEGER (0 . . . 15),
    mcsAndTBS                   INTEGER (0 . . . 31) ,
    frequencyHoppingOffset      INTEGER (1 . . . maxNrofPhysicalResource-
Blocks-1)          OPTIONAL,   -- Need M
    pathlossReference Index     INTEGER (0 . . . maxNrofPUSCH-Pathloss
ReferenceRSs-1),
    . . .
    }
        OPTIONAL -- Need R
}
```

When receiving configuration information for the grant-free based PUSCH transmission type 1 from the BS, the UE may transmit a PUSCH in the periodically configured resources 600 without a grant from the BS The various parameters required for PUSCH transmission (e.g., frequency hopping, DMRS configuration, an MCS, an RBG size, the number of repeated transmission times, an RV, precoding and the number of layers, antenna ports, a frequency hopping offset, etc.) may all comply with configuration values notified by the BS.

[Grant-free based PUSCH transmission type 2]

In the grant-free based PUSCH transmission type 2, the BS may configure the UE with some (e.g., periodicity information 603) of the information about particular time/frequency resources 600 that allow grant-free based PUSCH transmission through higher layer signaling, e.g., RRC signaling. Furthermore, the BS may configure the UE with various parameters for PUSCH transmission (e.g., frequency hopping, DMRS configuration, an MCS table, a RBG size, the number of repeated transmission times, an RV, etc.) via higher layer signaling. Specifically, the BS may configure the UE with configuration information of table 11 by higher layer signaling.

TABLE 11

```
ConfiguredGrantConfig : :=      SEQUENCE {
    frequencyHopping            ENUMERATED {mode1, mode2}
            OPTIONAL, -- Need S,
    cg-DMRS-Configuration       DMRS-UplinkConfig,
    mcs-Table                   ENUMERATED {qam256, spare1}
            OPTIONAL,   -- Need S
    mcs-TableTransformPrecoder  ENUMERATED {qam256, spare1}
            OPTIONAL, -- Need S
    uci-OnPUSCH                 SetupRelease    { CG-UCI-OnPUSCH },
    resourceAllocation          ENUMERATED { resourceAllocationType0,
resourceAllocationType1, dynamicSwitch },
    rbg-Size                    ENUMERATED {config2}
            OPTIONAL, -- Need S
    powerControlLoopToUse       ENUMERATED {n0, n1},
    p0-PUSCH-Alpha              P0-PUSCH-AlphaSetId,
    transformPrecoder           ENUMERATED {enabled}
            OPTIONAL, - - Need S
    nrofHARQ-Processes          INTEGER (1 . . . 16) ,
    repK                        ENUMERATED {n1, n2, n4, n8},
    repK-RV                     ENUMERATED {s1-0231, s2-0303, s3-0000}
            OPTIONAL, -- Cond RepK
```

TABLE 11-continued

| | |
|---|---|
| periodicity | ENUMERATED {<br>sym2, sym7, sym1x14, sym2x14, sym4x14, sym5x14, sym8x14, sym10x14, sym16x14, sym20x14,<br>sym32x14, sym40x14, sym64x14, sym80x14, sym128x14, sym160x14, sym256x14, sym320x14, sym512x14,<br>sym640x14, sym1024x14, sym1280x14, sym2560x14, sym5120x14,<br>sym6, sym1x12, sym2x12, sym4x12, sym5x12, sym8x12, sym10x12, sym16x12, sym20x12, sym32x12,<br>sym40x12, sym64x12, sym80x12, sym128x12, sym160x12, sym256x12, sym320x12, sym512x12, sym640x12,<br>sym1280x12, sym2560x12<br>}, |
| configuredGrantTimer | INTEGER (1 . . . 64)<br>OPTIONAL, -- Need R |
| } | |

The BS may configure the UE with a configured scheduling RNTI (CS-RNTI), and the UE may monitor a DCI format scrambled by the CS-RNTI. The DCI scrambled by the CS-RNTI may be used for the purpose of activating the grant-free based PUSCH transmission type 2 (i.e., for the purpose of allowing the UE for a grant-free based PUSCH). For example, when a DCI field in the DCI format scrambled by the CS-RNTI received by the UE satisfies a value written in table 12, it may be determined as a trigger for the grant-free based PUSCH transmission.

TABLE 12

| | DCI format at 0_0/0_1 |
|---|---|
| HARQ process number | set to all '0's |
| Redundancy version | set to '00' |

The BS may indicate the trigger for the grant-free based PUSCH transmission to the UE by using values of the particular fields, as well as notify the UE of specific time allocation information 701 and frequency allocation information 702 for the resource region 700 in which to perform the grant-free based PUSCH transmission through a resource allocation field of the corresponding DCI. The UE may determine the resource region 700 for grant-free PUSCH transmission from the periodicity information 703 configured by a higher layer and the time resource allocation information 701 and the frequency resource allocation information 702 obtained from the DCI scrambled by the CS-RNTI corresponding to the trigger, and perform the grant-free PUSCH transmission in the resource region 700. In other words, after the time when the DCI corresponding to the trigger is received, the UE may transmit a PUSCH in the periodically configured resources 700 without a grant from the BS. Some of the various parameters required by the UE to transmit a PUSCH, parameters in the table 11, such as DMRS configuration information, an MCS table, an RBG size, the number of repeated transmission times, an RV, a power control parameter, etc., may comply with values all configured by the BS through higher layer signaling, and the other parameters, e.g., parameters corresponding to a field of a DCI format 0_0/0_1, such as an MCS, preceding and the number of layers, antenna ports, a frequency hopping offset, etc., may comply with configuration values notified from the received DCI scrambled by the CS-RNTI for a trigger.

The BS may transmit DCI scrambled by a CS-RNTI for the purpose of releasing the grant-free based PUSCH transmission, i.e., the purpose of stopping to allow the UE for the grant-free based PUSCH transmission), in which case, when a field of the DCI format scrambled by the CS-RNTI received by the UE satisfies values of table 13, the UE may determine it as releasing the grant-free PUSCH transmission.

TABLE 13

| | DCI format 0_0 |
|---|---|
| HARQ process number | set to all '0's |
| Redundancy version | set to '00' |
| Modulation and coding scheme | set to all '1's |
| Resource block assignment | set to all '1's |

Next, a method in which UEs operating in NOMA in the grant-free based transmission method select an MA signature will be described.

For the method in which UEs operating in NOMA in the grant-free based transmission method select an MA signature, a "random activation" method and a "random Selection" method are being discussed. The two methods are termed to help understanding of the specification, but may be expressed differently. The "random activation" method allocates a UE-specific MA signature in a direct index through an RRC signal or DCI, or indirectly (which may be expressed in a combination of a UE-specific ID, a slot index, a grant-free transmission resource, etc.) to UEs that use the same grant-free based PUSCH transmission resource, depending on a grant-free PUSCH transmission type. pool Spool={S1, S2, . . . , SK} for an available MA signature may be defined between the BS and the UE, and the BS may indicate an MA signature index to the UE through an RRC signal or DCI. In this method, when the BS has a number of MA signatures more than the number of UEs to support in the same resource, collisions that might otherwise occur when multiple UEs perform transmission using the same MA signature (i.e., when the multiple UEs perform transmission with the same signature in NOMA, the BS is unable to distinguish the UEs involved in the transmission, and thus fails to perform reception) may not occur. According to the "random selection" method, common UEs that use the same grant-free PUSCH transmission resource of the BS may be allocated a common MA signature pool (including a number of different MA signatures). The UEs may then randomly select an MA signature in the MA signature pool, and perform transmission based on the selection. In this method, the BS may support UEs more than a limited number of MA signatures in the same resource. It is beneficial to an occasion, in particular, when respective UEs have independent and long transmission periodicities. While, as described above, the first method may prevent the same MA signature from being used between UEs, the second method may not avoid collisions between the UEs. In this case, the two MA signature selection methods may be regarded as the 'random activation" method when the BS configures UEs with MA signatures by higher layer signaling (RRC signaling) or L1 signaling (DCI signaling) or UE-specific MA signatures for the respective UEs, and regarded as the "random selection" method when the BS configures the UEs only with an MA signature pool.

Next, UL control information transmission on a PUSCH to be dealt with in the disclosure will be described, Occasions of transmitting UL control information on a PUSCH may be determined by the UE as follows:

In a first occasion, when, in a situation where CSI or SR information is configured to be transmitted on a PUCCH in certain multiple symbols in a cell by a higher layer signal or an RRC signal or a physical signal indicates that HARQ-ACK or CSI is to be transmitted in the certain multiple symbols, a physical signal indicates that UL data is to be transmitted on a PUCCH in symbols having the same time indexes as the certain multiple symbols, the UE may multiplex UL control information to be transmitted in the PUCCH with the UL data and then transmit a result of the multiplexing on the PUSCH. In this case, when one or more symbols in which to transmit the PUSCH and the PUCCH are the same, the UE may multiplex the UL control information with the UL data and transmit a result of the multiplexing on the PUSCH.

In a second occasion, when a physical signal indicates that UL data is to be transmitted on a PUSCH in certain multiple symbols and a bit field of a non-periodic channel report indicator (CSI request) included in the physical signal indicates that a non-periodic channel is to be reported, the UE may multiplex UL control information including non-periodic channel information with the UL data and transmit a result of the multiplexing on the PUSCH.

In a third occasion, when a physical signal indicates that UL control information is to be transmitted on a PUSCH in certain multiple symbols without UL data, the UE may transmit the UL control information including non-periodic channel information on the PUSCH.

In a fourth occasion, when each UE attempts to provide additional UL control information (including at least one of a TB size, an MCS, a UE ID, an MA signature, or an MA resource) to reduce reception and decoding complexity of the BS because the respective UEs may have different TB sizes and the MCSs in grant-free NOMA, the UE may multiplex UL control information with UL data and transmit a result of the multiplexing on a PUSCH. In the aforementioned first, second, third, or fourth occasion, a type of CSI transmission information required for CSI transmission or non-periodic channel transmission, e.g., whether channel information to be reported includes a CSI-RS resource indicator (CRI), a rank indicator (RI), or a layer indicator (LI), whether the channel information to be reported is a sub-band CQI, a wide-band CQI, a sub-band PMI, or a wide-band PMI whether the channel information type to be reported is type I CSI or type II CSI, etc., may be configured for the UE by a higher layer signal or an RRC signal.

In the aforementioned first, second, third, or fourth occasion, the UL control information may use different channel coding depending on the bit size. For example, when the UL control information is equal to or less than 11 bits, the UE may use Reed-Muller (RM) coding to encode the UL control information, and when the UL control information is greater than 11 bits, the UE may use polar coding to encode the UL control information.

Next, PUSCH mapping schemes for each UL control information on an occasion when pieces of the UL control information are multiplexed on a PUSCH will be described.

Figure 8:
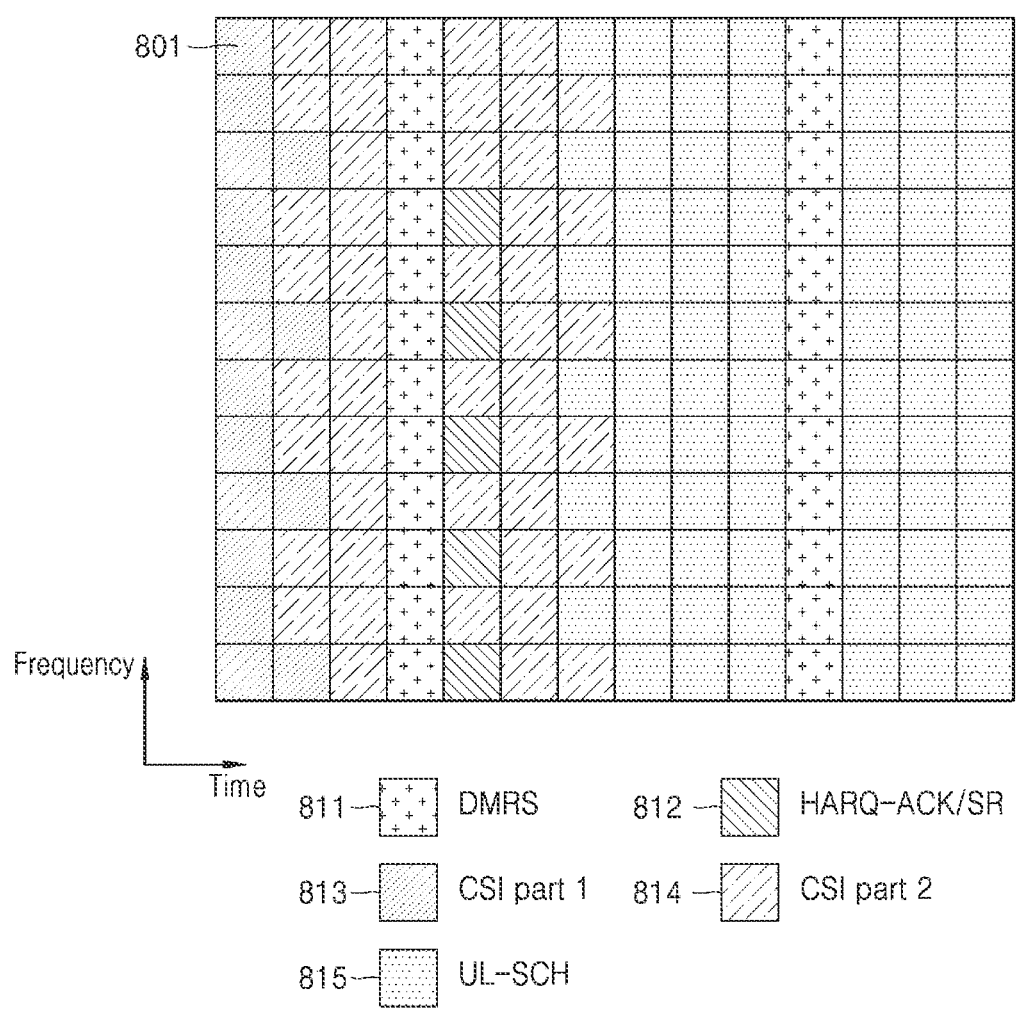
FIGS. 8 and 9 are diagrams for describing a method in which each uplink control information is mapped to a physical uplink shared channel (PUSCH)
Figure 9:
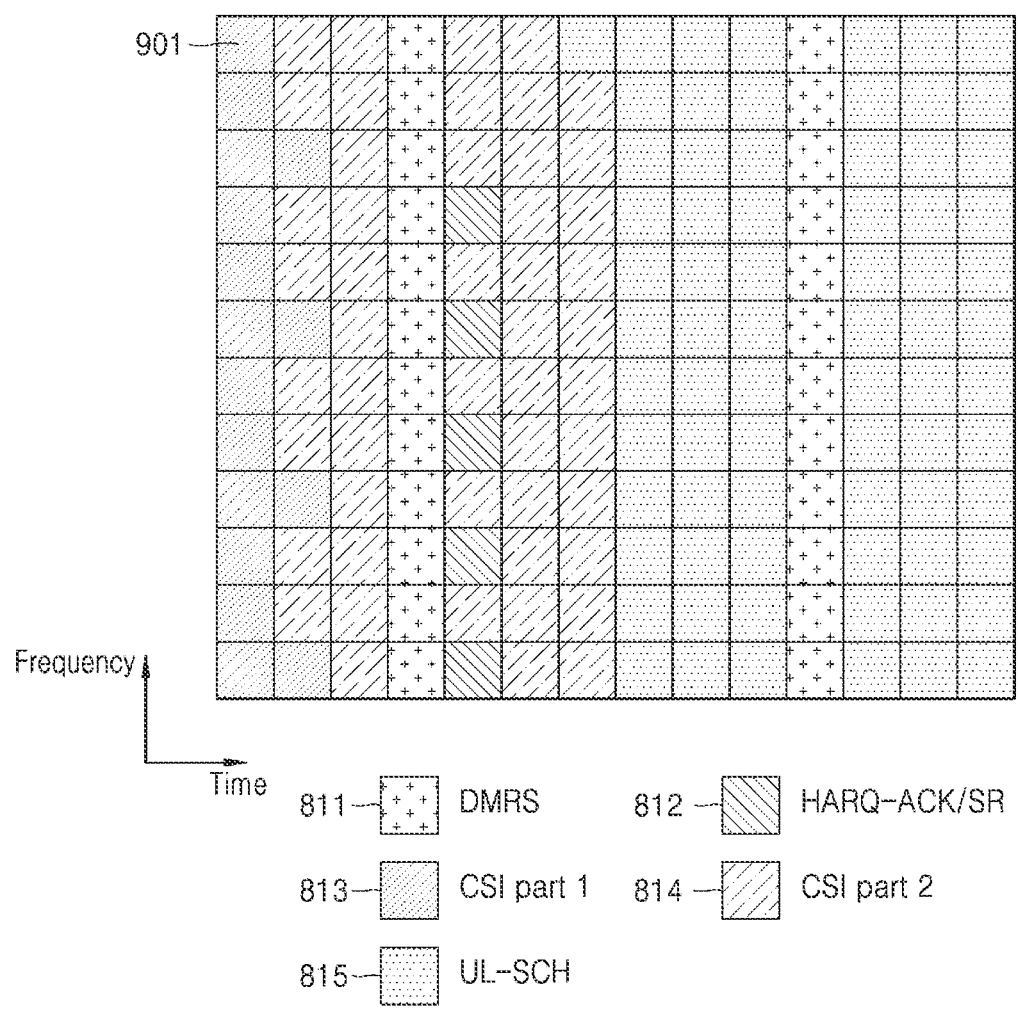

FIGS. 8 and 9 are diagrams for describing a method in which each uplink control information is mapped to a PUSCH. HARQ-ACK/SR 812 may be mapped from a first non-DMRS symbol after the first of DMRS symbols 811, CSI part 1 813 may be mapped from a first non-DMRS symbol of PUSCH transmission, and CSI part 2 814 may be mapped to remaining resources after the mapping of the CSI part 1 813. FIG. 8 shows an example in which HARQ-ACK/SR 812 punctures the CSI part 2 814 because the HARQ-ACK/SR 812 is equal to or less than 2 bits, and FIG. 9 shows an example in which HARQ-ACK/SR 912 does not puncture CSI part 2 914 but rate-matched because the HARQ-ACK/AR 912 is greater than 2 bits, so the CSI part 2 914 is not mapped to a resource, to which the HARQ-ACK/SR 912 is mapped. Unlike FIG. 8, in FIG. 9, mapping of the CSI part 2 914 is not allowed at a place in which the HARQ-ACK/SR 912 is mapped, so that it may be seen that the CSI part 914 are further mapped to 5 REs in the 7-th OFDIM symbol. The BS and the UE may each calculate the number of entire code bits based on its UL control information, to ensure not only reliability of the UL control information but also a resource to which UL-SCH may be mapped on the PUSCH.

Embodiments of the disclosure will now be described in conjunction with accompanying drawings. Although the following embodiments will focus on the 5G wireless communication system as an example, they may be equally applied to other communication systems with similar technical backgrounds or channel types. The embodiments of the disclosure will be applied not only to the 5G communication system, but also LTE and LTE-A or any communication system after 5G. Furthermore, embodiments of the disclosure will also be applied to different communication systems with some modifications to such an extent that does not significantly deviate from the scope of the disclosure when determined by those of ordinary skill in the art.

In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

<First Embodiment>

A UE may be configured explicitly (a BS may configure UEs by higher layer signaling (RRC signaling) or L1 signaling (DCI signaling)) or indirectly (when the UE is configured from a BS with an MA signature or an MA signature pool, the UE may determine it as NOMA transmission) with whether transmission is to be performed in NOMA or OMA. In the existing OMA 5G transmission instead of NOMA transmission, no collision occurs between UEs, so in the aforementioned first, second, third, or fourth occasion, the UE may multiplex and transmit the UL control information on a PUSCH, but in NOMA, unlike OMA, multiple UEs may perform transmission in the same resource and accordingly, in the grant-free based transmission method, the UE may randomly transmit data, so the BS needs to estimate from an MA signature ID, which UE transmits the PUSCH and what is transmitted by the UE. In this case, when collisions occur between UEs performing transmission with the same MA signature, sometimes the information transmitted by the UEs that collide with each other may not be recovered. Hence, in an embodiment of the disclosure, in the first, second, third, or fourth occasion where the UL control information and the PUSCH overlap each other, a method of determining whether to multiplex or not to multiplex the relatively very important UL control information on the PUSCH transmitted in NOMA is proposed The following methods may be considered for the method of determining whether to multiplex UL control information on a PUSCH:

[Method 1]

A BS may explicitly configure a UE with multiplexing of UL control information for a PUSCH by higher layer signaling (RRC signaling) or L1 signaling (DCI signaling).

[Method 2]

As described above, in NOMA, the "random activation" method and the "random selection" method may be considered for a method of selecting an MA signature by UEs for the grant-free based transmission: When the UE is configured by the BS with the "random activation" method via RRC signaling or DCI or receives a UE-specific MA signature, the UE may be considered to multiplex the UL control information on the PUSCH. No collisions occur between UEs in the "random activation" method, so the multiplexing may be performed when it corresponds to the aforementioned four occasions.

On the other hand, when the UE is configured by the BS with the "random selection" method via RRC signaling or DCI or allocated only an MA signature pool, the UE may be considered not to multiplex the UL control information on the PUSCH. Because UEs perform transmission by randomly selecting an MA signature in the MA signature pool in the "random selection" method, a collision between the UEs that select the same MA signature is likely to occur, so the UL control information, which is essential information to be received, may be transmitted without being multiplexed.

[Method 3]

Various pieces of information that may be included in the UL control information have priorities, so the UE may determine whether to multiplex the UL control information on the PUSCH depending on information included in the UL control information. As described above, sometimes the BS is unable to perform reception at all because of collisions between UEs in case of NOMA, so the UL control information may be considered not to be multiplexed on the PUSCH when HARQ-ACK information with high priority is included in the UL control information. As for the UL control information not including the HARQ-ACK information, its priority is not high and the BS may request it again, so the UL control information may be considered to be multiplexed on the PUSCH.

[Method 4]

Considering both the methods 2 and 3, when the UE is configured by the BS with the "random selection" method, in which collisions between UEs may occur and the UL control information includes HARQ-ACK with high priority, the UL control information may be considered not to be multiplexed on the grant-free PUSCH in NOMA. Otherwise, the UL control information may be considered to be multiplexed on the grant-free based PUSCH.

The aforementioned methods 1, 2, 3, and 4 may be operated in combination.

Figure 10A:
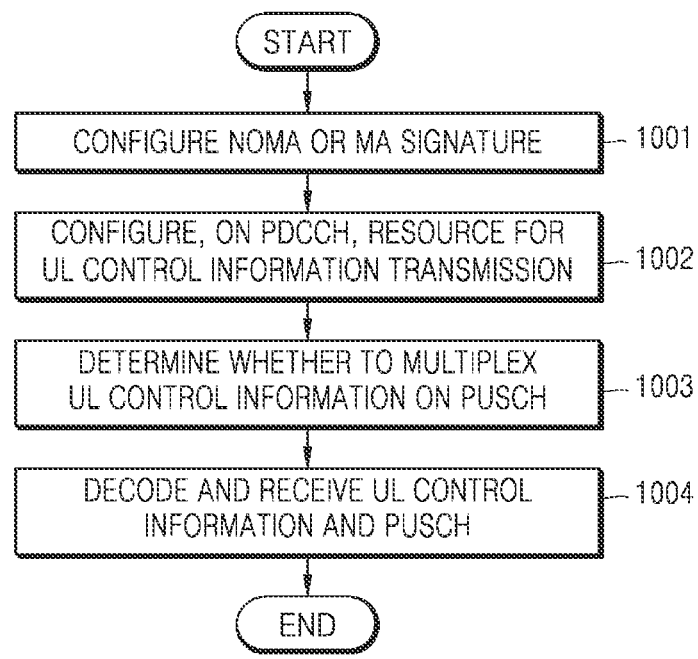
FIG. 10A is a flowchart for describing operation of a base station (BS), according to a first embodiment.

FIG. 10A is a flowchart for describing operation of a BS, according to a first embodiment.

Explaining a BS procedure first, the BS may configure a UE with a NOMA scheme or an MA signature for the purpose of PUSCH transmission via higher layer signaling or L1 signaling, in operation 1001. The BS may configure a resource on which to transmit UL control information, in operation 1002. The BS may also configure an MA signature for transmission of the UL control information, in the operation 1002. In this case, information about the resource and MA signature for transmission of the UL control information may be provided to the UE by higher layer signaling or L1 signaling. Operations 1001 and 1002 are described sequentially for convenience of explanation, but may be performed at the same time or in a different order.

The BS may determine whether the UE has multiplexed the UL control information on the PUSCH in a configured grant-free transmission resource, in operation 1003.

The BS may perform decoding and reception on the UL control information and the PUSCH, in operation 1004.

Figure 10B:
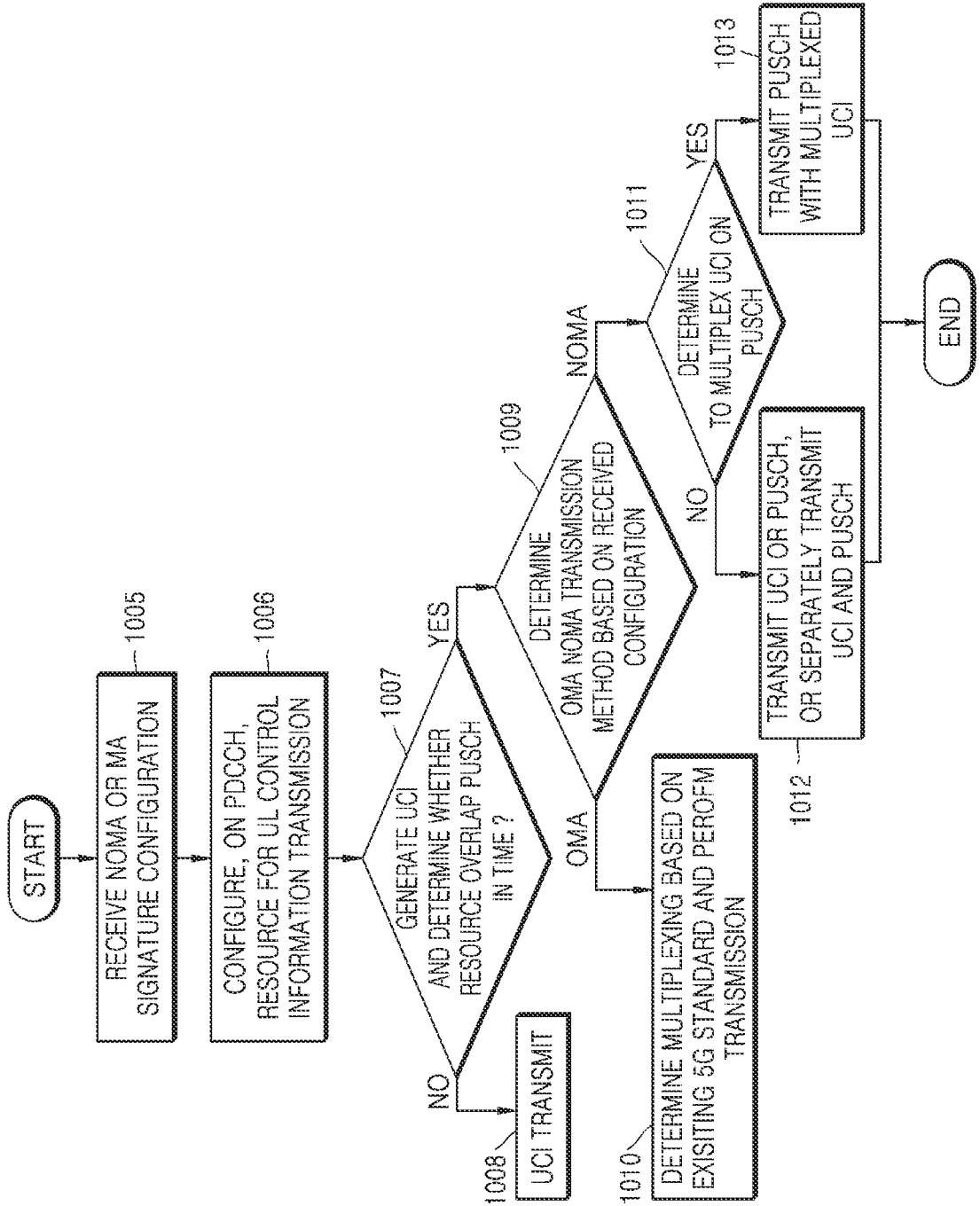
FIG. 10B is a flowchart for describing operation of a user equipment (UE), according to a first embodiment.

FIG. 10B is a flowchart for describing operation of a UE, according to a first embodiment.

The UE may receive configuration information for a grant-free transmission resource and an MA signature determination method for PUSCH transmission, in operation 1005. The UE may receive information about a resource on which to transmit UL control information, in operation 1006. The UE may also receive information about an MA signature for transmission of the UL control information, in the operation 1006. In this case, information about the resource and MA signature for transmission of the UL control information may be provided to the UE by higher layer signaling or L1 signaling. Operations 1005 and 1006 are described sequentially for convenience of explanation, but may be performed at the same time or in a different order.

The UE may determine whether a resource to transmit the UL control information overlaps a resource to transmit the PUSCH in time, in operation 1007. When the resource to transmit the UL control information and the resource to transmit the PUSCH do not overlap in time, the UE may transmit the UL control information in operation 1008. When the resource to transmit the UL control information and the resource to transmit the PUSCH overlap in time, the UE may determine whether to perform transmission in OMA or NOMA based on the received configuration, in operation 1009.

When the UE determines that transmission is to be performed in OMA, the UE may determine multiplexing based on the aforementioned methods and perform transmission, and when the UE determines that transmission is to be performed in NOMA, the UE may determine multiplexing of the UL control information on the grant-free based PUSCH in the aforementioned methods, in operation 1011. When it is determined to perform multiplexing, the UE may multiplex the UL control information on the grant-free based PUSCH and transmit a result of the multiplexing, in operation 1013. When it is determined not to perform multiplexing, the UE may drop one of the PUSCH and the UL control information or transmit them separately, in operation 1012.

In the first embodiment of the disclosure, each UE may determine whether to multiplex UL control information on a grant-free PUSCH in NOMA. The BS may determine whether the UL control information has been multiplexed on the PUSCH in advance, thereby minimizing complexity required in determining whether a PUSCH has been transmitted from each UE in NOMA.

<Second Embodiment>

In a case of multiplexing UL control information on a grant-free based PUSCH in NOMA, some UEs transmit a PUSCH with multiplexed UL control information and some UEs transmit the existing PUSCH in the same resource. In this case, as described above, relatively important UL control information or a PUSCH with multiplexed UL control information is more important than the existing PUSCH, so a multiplexing scheme is required to basically prevent or reduce collisions between UEs.

For a method of transmitting a PUSCH with multiplexed UL control information, the following methods may be considered.

[Method 1]

hi a case that UL control information is multiplexed on a PUSCH, as described above with reference to FIG. 8 or 9, the number of symbols for respective pieces of information included in the UL control information is calculated, and accordingly, each UL control information may be mapped to the PUSCH. In NOMA, each UE performs MA signature based transmission, and UL control information mapped to the PUSCH may be transmitted based on an MA signature configured for the PUSCH, another MA signature other than an MA signature pool, or the MA signature pool, to basically prevent or reduce collisions between UEs. That is, each UE may transmit data and UL control information mapped to a PUSCH based on different MA signatures. In this case, a method of configuring an MA signature for UL control information configured for each UE may employ the following methods:

[Method 1-1]

A BS may semi-statically configure a UE configured with the "random selection" method with two MA signature pools to be used for data and UL control information through higher layer signaling (e.g., cell-common or UE-specific RRC signaling or MAC CE signaling). For example, the BS may allocate an MA signature pool larger than the other MA signature pool for data to the UL control information (i.e., the former MA signature pool has more signatures) or configure an MA signature pool with better performance (performance may be different for each combination of MA signatures) for the UL control information, because the UL control information is more important than the data. In this case, because the MA signature pool for the UL control information is larger or has better performance than the other MA signature pool for the data, a collision between the UL control information and the data may be reduced or avoided, or collisions between pieces of UL control information may be reduced. This gives the BS an advantage of doing reception of UL control information better,

[Method 1-2]

A BS may semi-statically configure a UE configured with the "random selection" method with an MA signature pool to be used for data and a UE-specific MA signature to be used for UL control information through higher layer signaling (e.g., cell-common or UE-specific RRC signaling or MAC CE signaling). As described above, in the case that the UE selects an MA signature in the "random selection" method, an opportunity of collision that may occur when different UEs select the same MA signature may be prevented by configuring a UE-specific signature for the UL control information, thereby giving an advantage of avoiding a collision of UL control information and data between UEs or collisions of UL control information between UEs.

[Method 1-3]

A BS may dynamically indicate a UE-specific MA signature to be used for UL control information to a UE by L1 signaling (e.g., DCI). The BS may indicate a resource on which to transmit the UL control information to the UE in DCI. The BS may indicate in DCI an MA signature for UL control information multiplexed on a PUSCH. When a resource to transmit the UL control information and a resource to transmit a PUSCH overlap each other, the UE may multiplex the UL control information on the PUSCH through the configured MA signature. This may enable a different MA signature from an MA signature or MA signature pool configured for the PUSCH to be allocated for the UL control information in the case that the PUSCH and the UL control information are multiplexed, thereby avoiding collisions of UL control information and data or inter-UL control information collision between UEs according to the method 1-3.

[Method 1-4]

A BS may dynamically indicate am MA signature pool to be used for UL control information to a UE by L1 signaling (e.g., DCI). As described above, the BS may indicate a resource on which to transmit the UL control information to the UE in DCI. With the DCI, the BS may indicate to the UE the MA signature pool for UL control information multiplexed on a PUSCH. When a resource on which to transmit the UL control information and a resource on which to transmit the PUSCH overlap each other, the UE may multiplex the UL control information on the PUSCH by randomly selecting an MA signature from the configured MA signature pool. This may enable a different MA signature from an MA signature or MA signature pool configured for the PUSCH to be allocated for the UL control information in the case that the PUSCH and the UL control information are multiplexed, thereby avoiding collisions of UL control information and data between UEs according to the method 1-4.

In a case that the BS configures the UE with an MA signature pool or an MA signature to transmit UL control information in NOMA when the UL control information is multiplexed on the PUSCH, the BS may determine that the UL control information has been multiplexed on the PUSCH, to separate the multiplexed UL control information from PUSCHs transmitted by other UEs based on an MA signature pool or an MA signature configured for the multiplexed UL control information and detect a UE (as described above in the aforementioned methods, the MA signature pool or the MA signature configured for the multiplexed UL control information has better detection performance than that configured for data). The BS may then perform decoding and reception of the PUSCH except for the UL control information based on the detected information.

The aforementioned methods 1-1, 1-2, 1-3, and 1-4 may be equally applied to an occasion for a particular UL control information (HARQ-ACK information with high priority) rather than a method of configuring a MA signature for the whole multiplexed UL control information.

[Method 2]

While a different MA signature is configured for UL control information mapped to a PUSCH when the UL control information is multiplexed on the PUSCH in the method 1, method 2 proposes a method of configuring a different MA signature for the PUSCH with the multiplexed UL control information. In NOMA, each UE performs MA signature based transmission, and a PUSCH with multiplexed UL control information may be transmitted based on an MA signature or an MA signature pool other than the MA signature or MA signature pool configured for a PUSCH on which UL control information is not multiplexed, to basically prevent or reduce collisions between UEs. That is, the PUSCH with multiplexed UL control information and the PUSCH on which UL control information is not multiplexed may be transmitted based on different MA signatures. In this case, a method of configuring an MA signature for UL control information configured for each UE may employ the following methods:

[Method 2-1]

The BS may semi-statically configure a UE configured with the "random selection" method with two MA signature pools to be used for a PUSCH with multiplexed UL control information and a PUSCH on which UL control information is not multiplexed through higher layer signaling (e.g., cell-common or UE-specific RRC signaling or MAC CE signaling). For example, because a PUSCH with multiplexed UL control information is more important than a PUSCH on which UL control information is not multiplexed, the BS may allocate an MA signature pool larger than the other MA signature pool for the PUSCH on which UL control information is not multiplexed to the PUSCH with multiplexed UL control information (i.e., the former MA signature pool has more signatures) or configure an MA signature pool with better performance (performance may be different for each combination of MA signatures) for the PUSCH with multiplexed UL control information. In this case, the MA signature pool for a PUSCH with multiplexed UL control information is different from but larger than or has better performance than an MA signature pool for a PUSCH on which UL control information is not multiplexed, thereby reducing or avoiding collisions between the PUSCH with multiplexed UL control information and the PUSCH on which UL control information is not multiplexed, or reducing collisions between PUSCHs with multiplexed UL control information in the method 2-1. This may make the BS to do reception of a PUSCH with multiplexed UL control information better.

[Method 2-2]

A BS may semi-statically configure a UE configured with the "random selection" method with an MA signature pool to be used for a PUSCH on which UL control information is not multiplexed and a UE-specific MA signature to be used for a PUSCH with multiplexed UL control information through higher layer signaling (e.g., cell-common or UE-specific RRC signaling or MAC CE signaling). As described above, in the case that the UE selects an MA signature in the "random selection" method, different UEs may select the same MA signature and thus, a collision may occur. The BS may configure a UE-specific signature for the PUSCH with multiplexed UL control information, thereby avoiding collisions between a PUSCH with multiplexed UL control information and a PUSCH on which UL control information is not multiplexed between UEs, or collisions between PUSCHs with multiplexed UL control information.

[Method 2-3]

A BS may dynamically indicate a UE-specific MA signature to be used for a PUSCH with multiplexed UL control information to a UE by L1 signaling (e.g., DCI). The BS may indicate a resource on which to transmit the UL control information to the UE in DCI. The BS may indicate in DCI an MA signature for the PUSCH on which UL control information is not multiplexed. When a resource on which to transmit the PUSCH and a resource on which to transmit UL control information overlap each other, the UE may transmit the PUSCH on which the UL control information is multiplexed through the configured MA signature. This may enable a different MA signature from an MA signature or MA signature pool configured for a PUSCH on which UL control information is not multiplexed to be allocated for a PUSCH with multiplexed UL control information in the case that the PUSCH and the UL control information are multiplexed, thereby avoiding collisions between the PUSCH with multiplexed UL control information and the PUSCH on which UL control information is not multiplexed between UEs or collisions between UEs or collisions between PUSCHs with multiplexed UL control information.

[Method 24]

A BS may dynamically indicate an MA signature pool to be used for a PUSCH with multiplexed UL control information to a UE by L1 signaling (e.g., DCI). The BS may indicate a resource on which to transmit the UL control information to the UE in DCI. The BS may indicate in the DCI an MA signature pool for the PUSCH with multiplexed UL control information. When a resource on which to transmit the UL control information and a resource on which to transmit the PUSCH overlap each other, the UE may transmit the PUSCH with multiplexed UL control information by randomly selecting an MA signature from the configured MA signature pool. This may enable the BS to allocate a different MA signature from an MA signature or MA signature pool configured for a PUSCH on which UL control information is not multiplexed to a PUSCH with multiplexed UL control information, thereby avoiding collisions between the PUSCH with multiplexed UL control information and the PUSCH on which UL control information is not multiplexed between UEs.

In a case that the BS configures the UE with an MA signature pool or an MA signature to transmit a PUSCH with multiplexed UL control information in NOMA as in the above methods when the UL control information is multiplexed on the PUSCH, the BS may determine that the UL control information has been multiplexed on the PUSCH, to separate the PUSCH with multiplexed UL control information from PUSCHs transmitted by other UEs based on an MA signature pool or an MA signature configured for the PUSCH with multiplexed UL control information and detect it (as described above in the aforementioned methods, the MA signature pool or the MA signature configured for the PUSCH with the multiplexed UL control information has better detection performance than that configured for the PUSCH on which UL control information is not multiplexed). The BS may then separately decode the UL control information and the PUSCH from the PUSCH with the multiplexed UL control information.

The aforementioned methods 2-1, 2-2, 2-3, and 2-4 may be equally applied to an occasion for a PUSCH on which a particular UL control information (HARQ-ACK information with high priority) is multiplexed, rather than a method of configuring an MA signature for a PUSCH on which all the UL control information is multiplexed.

Collisions between UEs may be basically prevented or minimized when the UL control information is multiplexed on the PUSCH according to the second embodiment of the disclosure, and accordingly, the BS may have best performance of detecting multiplexed UL control information or a PUSCH with multiplexed UL control information.

<Third Embodiment>

In NOMA, the BS may not multiplex UL control information configured in OMA on a grant-free based PUSCH by considering collisions between UEs. In this case, a method of determining which resource of the UL control information and the PUSCH is to be transmitted is required. As the UL control information may be transmitted in OMA but collisions do not occur even for the grant-free PUSCH when an MA signature determination method is the "random activation" method, a method for determining whether the UE transmits UL control information or a PUSCH based on the type of UL control information and the MA signature determination method for a grant-free based PUSCH is required.

In a case that the UL control information is not multiplexed, the following methods may be considered for the UE to determine which one of the UL control information and the FUSCH is to be transmitted.

[Method 1]

As described above, there may be an occasion when a collision occurs between UEs depending on a method of configuring an MA signature in NOMA. Furthermore, as for the UL control information, it may have a priority depending on the type of the information. For example, HARQ-ACK information, which is one of pieces of the UL control information, is very important, so a PUSCH overlapping the UL control information including the HARQ-ACK information may not be transmitted but may be transmitted in a non-overlapping time in the case of the grant-free based transmission (in a case of grant based transmission, a PUSCH overlapping the UL control information may be dropped). For UL control information not including the HARQ-ACK information, when an MA signature for an overlapping PUSCH is configured in the "random activation" method, the UE may not transmit the UL control information but transmit the PUSCH. In a case that an MA signature is configured for the PUSCH in the "random selection" method, collisions may occur between UEs, so the UE may transmit UL control information that ensures no collision occurrence.

[Method 2]

The BS may explicitly configure a priority by higher layer signaling (RRC signaling) or L1 signaling (DCI signaling) for the UE to determine which one of the PUSCH and the UL control information is not to be transmitted.

Based on the aforementioned methods, the BS may increase the possibility of detecting UEs that perform NOMA based transmission in grant-free based PUSCH resources and reduce receiver complexity by determining in advance whether the UE will transmit UL control information or a PUSCH when the UE does not multiplex the UL control information on the PUSCH <Fourth Embodiment>

Because collisions may occur between UEs in a case that UL control information is multiplexed on a PUSCH in NOMA, the method of mapping UL control information to a PUSCH may differ from a method of mapping UL control information to a PUSCH in OMA. As the UL control information is important, the UE may transmit the UL control information on designated resource in OMA when the UL control information is multiplexed and mapped to a PUSCH. For this, the BS may configure the UE with not only a resource on which to transmit a PUSCH in NOMA but also an extra OMA resource for multiplexing the UL control information in the NOMA resource directly in NOMA transmission through RRC signaling or indirectly (when configured with an MA signature/MA signature pool, the UE determines it as NOMA transmission). In this case, it is very inefficient to transmit all the UL control information in OMA because the OMA transmission requires allocation of a lot of resources to OMA. Hence, the BS may allocate only HARQ-ACK, the priority of which is high and the number of bits of which is relatively small, to OMA.

Figure 11:
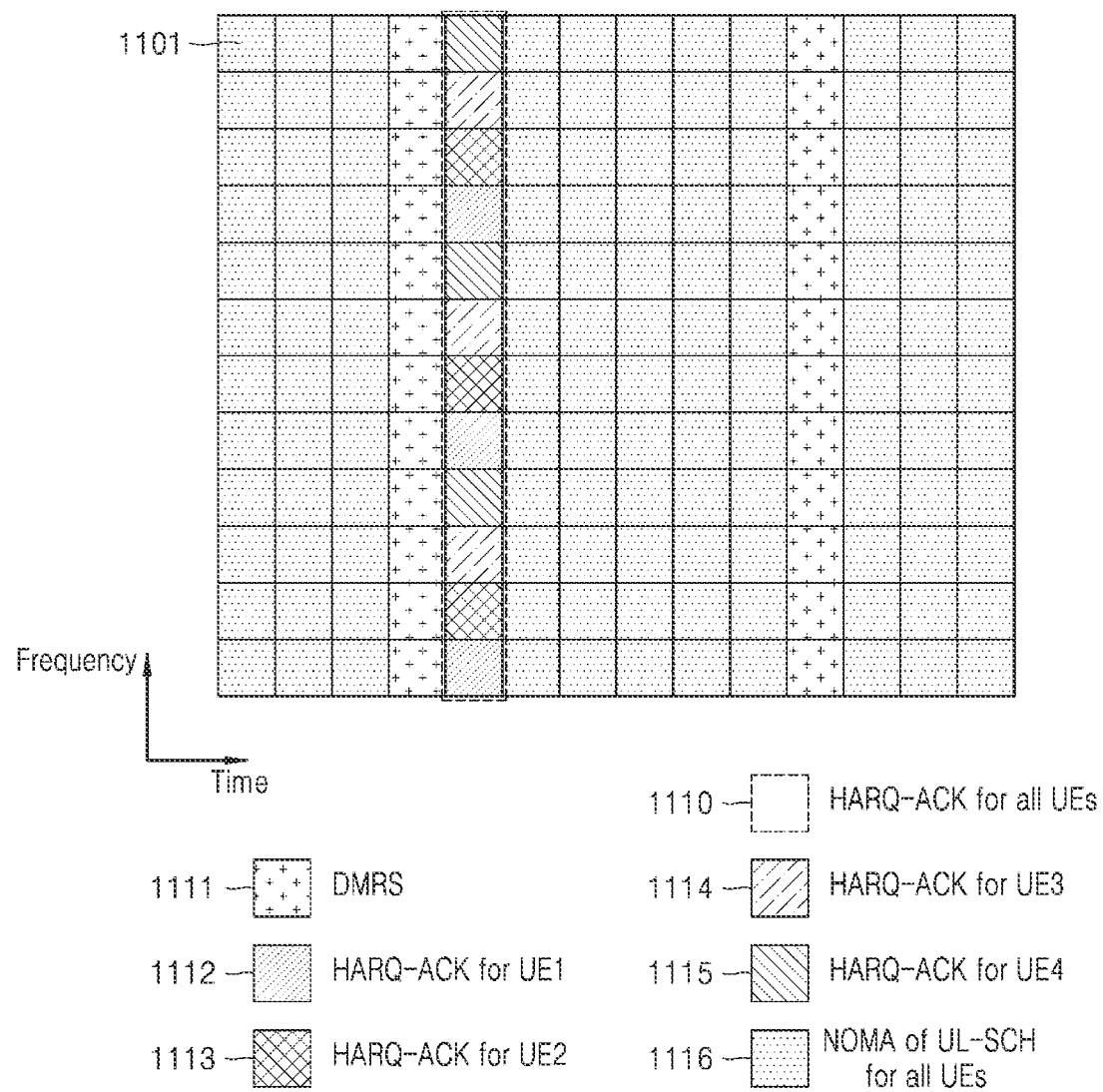
FIG. 11 is a diagram for describing a method of configuring an orthogonal multiple access (OMA) resource for hybrid automatic repeat request (HARQ) positive acknowledgement (ACK) information in NOMA resources, according to an embodiment.

FIG. 11 is a diagram for describing a method of configuring an OMA resource for HARQ-ACK information in NOMA resources, according to an embodiment.

Resources 1110 for HARQ-ACK information for all UEs may be configured, and resources 1112, 1113, 1114, and 1115 for HARQ-ACK information of the respective UEs may be configured not to overlap each other between UEs in the time or frequency resources like OMA. The remaining resources 1116 except for DMRSs 1111 may be operated in NOMA in which multiple UEs may perform transmission in the same resource.

In a case of multiplexing the HARQ-ACK information on a PUSCH, the following methods may be considered for resource allocation,

[Method 1]

When a BS transmits a PDCCH and a PDSCH for a UE to transmit HARQ-ACK, the BS and the UE may calculate the number of bits of the HARQ-ACK to be transmitted and an amount of corresponding resources. Based on this, the BS may dynamically indicate, in DCI, resources to be mapped with the HARQ-ACK. Information in which the BS configures the UE with the resources to be mapped with the HARQ-ACK in OMA may include time domain resource allocation information and frequency domain resource avocation information for HARQ-ACK transmission.

[Method 2]

The resources to be mapped with the HARQ-ACK may be determined UE-specifically (or UE-group-specifically). Different UEs for which grant-free transmission resources are configured may have resources to be mapped with different HARQ-ACK. For example, the resources to be mapped with the HARQ-ACK may be defined based on one or more of the following parameters:

the number of MA signatures in an MA signature pool allocated for NOMA resources the number of HARQ-ACK bits to be transmitted by the UE a UE-specific identifier a time index (symbol index or slot index)

The UE-specific identifier may correspond to at least one of the following parameters, for example:

a UE identity (UE ID)

a DMRS scrambling ID an MS signature ID an ID additionally configured by the BS

The parameters related to resources to be mapped with the HARQ-ACK may be predefined, or may be configured by the BS for the UE by higher layer signaling (e.g., RRC signaling) or L1 signaling (e.g., DCI).

Figure 12A:
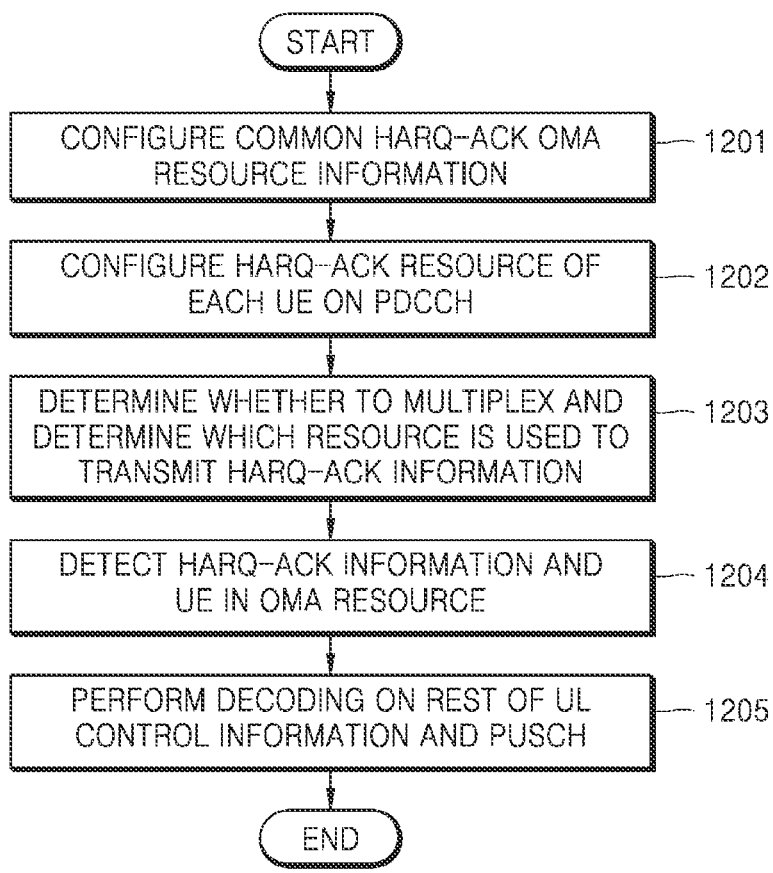
FIG. 12A is a flowchart for describing operation of a BS, according to a fourth embodiment.

FIG. 12A is a flowchart for describing operation of a BS, according to a fourth embodiment.

A BS may configure all UEs with configuration information for common OMA resources for HARQ-ACK via higher layer signaling or L1 signaling, in operation 1201. The BS may configure a UE with resources for transmission of UL control information (including an OMA HARQ-ACK resource for multiplexing on a PUSCH), in operation 1202.

The BS may determine whether the UE has multiplexed the UL control information on the PUSCH in a configured grant-free transmission resource and determine which resource will be used to transmit the HARQ-ACK information, in operation 1203. The BS may perform detection of a UE by firstly detecting HARQ-ACK information in an OMA resource, in operation 1204. The BS may perform decoding on the rest of the UL control information and the PUSCH, in operation 1205.

Figure 12B:
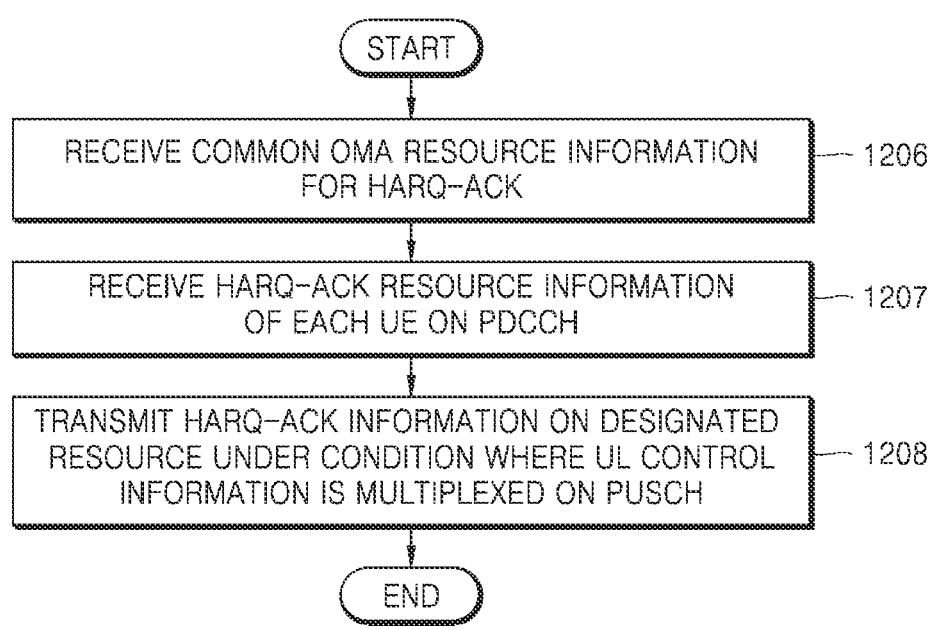
FIG. 12B is a flowchart for describing operation of a UE, according to the fourth embodiment.

FIG. 12B is a flowchart for describing operation of a UE, according to a fourth embodiment. A UE may receive configuration information for common OMA resources for HARQ-ACK, in operation 1206. The UE may receive a PDCCH that includes information about resources in which to transmit UL control information (including an OMA HARQ-ACK resource for multiplexing on a PUSCH), in operation 1207. The UE may transmit HARQ-ACK information on a designated resource in a condition that UL control information is multiplexed on a PUSCH.

In the fourth embodiment of the disclosure, each UE may send HARQ-ACK information in OMA in a case that UL control information is multiplexed on a PUSCH in NOMA, thereby helping to prevent a collision between UEs and detect the UE. Accordingly, complexity required in determining whether a PUSCH is transmitted by each UE in NOMA may be minimized.

Figure 13:
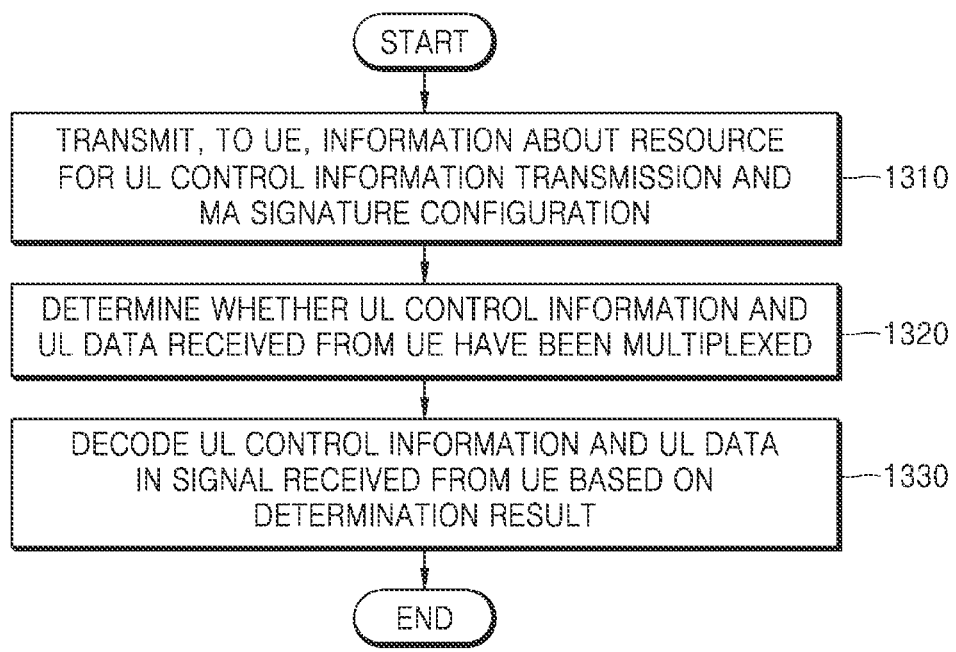
FIG. 13 is a flowchart for describing operation of a BS, according to an embodiment.

FIG. 13 is a flowchart for describing operation of a BS, according to an embodiment.

In operation 1310, a BS may transmit, to a UE, information about a resource for UL control information transmission and MA signature configuration. The information about MA signature configuration may include information about an MA signature determined according to what is described in one of the aforementioned first to fourth embodiments.

In operation 1320, the BS may determine whether UL control information and UL data (PUSCH) received from the UE have been multiplexed by the UE. For example, on an occasion when the BS requests UL control information from a UE and receives the UL control information from the UE on a data channel instead of a control channel, the BS may determine that the UL control information has been multiplexed on the PUSCH. It is, however, merely an example, and how the BS determines whether the UL control information and the UL data have been multiplexed is not limited to this example.

In operation 1330, based on a result of the determining, the BS may decode at least one of the UL control information and the UL data in the signals received from the UE.

Figure 14:
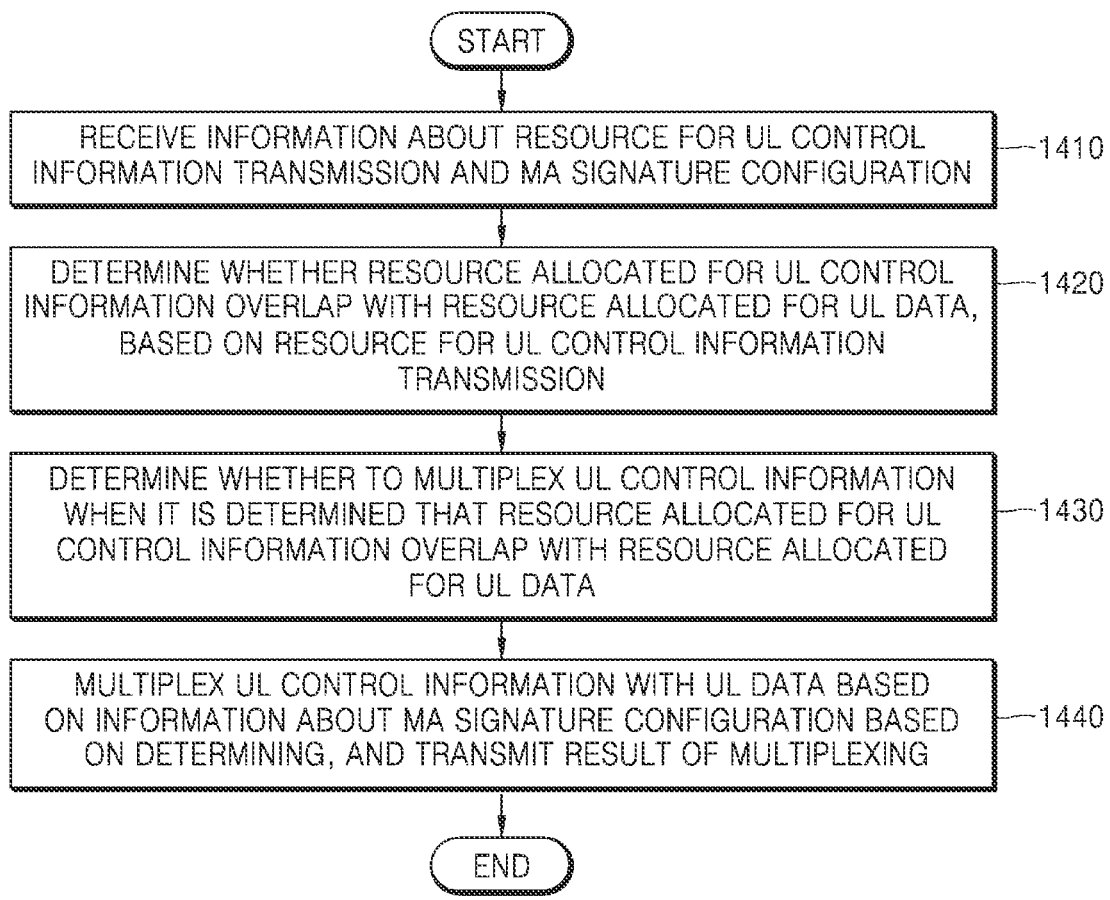
FIG. 14 is a flowchart for describing operation of a UE, according to an embodiment.

FIG. 14 is a flowchart for describing operation of a UE, according to an embodiment.

In operation 1410, a UE may receive information about a resource for UL control information transmission and MA signature configuration.

In operation 1420, the UE may determine based on the resource for UL control information transmission whether the resource allocated for the UL control information transmission overlaps a resource allocated for UL data transmission.

In operation 1430, the UE may determine whether to multiplex the UL control information when it is determined that the resource allocated for the UL control information transmission overlaps the resource allocated for the UL data transmission. How the UE determines whether to multiplex the UL control information may use the aforementioned method in the disclosure.

Figure 15:
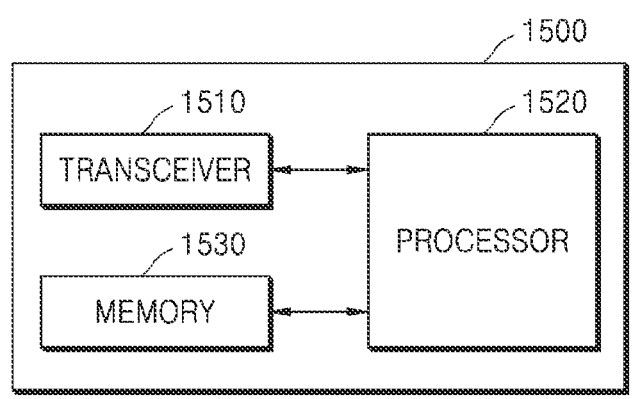
FIG. 15 is a block diagram of a UE, according to an embodiment.

In operation 1440, based on a result of the determining, the UE may multiplex the UL control information with the UL data based on the information about the MA signature configuration and transmit a result of the multiplexing, FIG. 15 is a block diagram of a UE 1500, according to an embodiment.

Referring to FIG. 15, the UE 1500 may include a transceiver 1510, a processor 1520, and a memory 1530. According to the grant-free UL data channel transmission method and DL control information transmission method for supporting NOMA in a 5G communication system corresponding to the aforementioned embodiments, the transceiver 150, processor 1520, and memory 1530 of the UE 1500 may be operated. The elements of the UE 1500 is not, however, limited thereto. For example, the UE 1500 may include more or fewer elements than described above. In addition, in a special occasion, the transceiver 1510, processor 1520, and memory 1530 may be implemented in a single chip.

The transceiver 1510 may include a transmitter and a receiver in another embodiment. The transceiver 1510 may transmit or receive signals to or from a BS. The signals may include control information and data. For this, the transceiver 1510 may include an RF transmitter for up-converting the frequency of a signal to be transmitted and amplifying the signal and an RF receiver for low-noise amplifying a received signal and down-converting the frequency of the received signal. In addition, the transceiver 1510 may receive a signal on a wireless channel and output the signal to the processor 1520, or transmit a signal output from the processor 1520 on a wireless channel.

The processor 1520 may control a series of processes for the UE 1500 to be operated according to the embodiments of the disclosure. For example, the processor 1520 may differently control a grant-free based transmission method for NOMA, i.e., a method of transmitting UL data in a portion of the grant-free transmission resource, a UL control information transmission method, a DMRS transmission method, etc., according to embodiments of the disclosure.

The memory 1530 may store control information such as information about MA signature configuration or data included in a signal obtained in the UE 1500, and have sectors for storing data required to control the processor 1520 and data that occurs in the control operation of the processor 1520.

Figure 16:
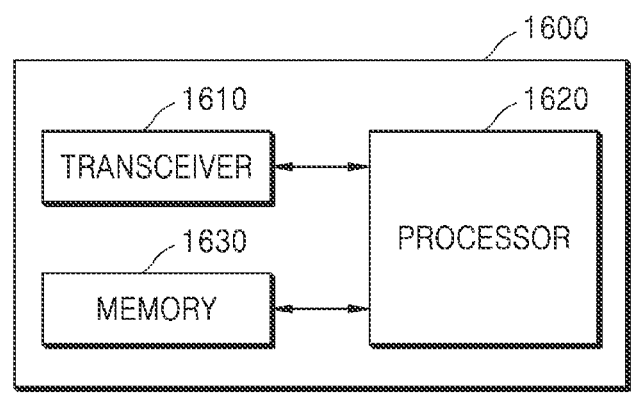
FIG. 16 is a block diagram of a BS, according to an embodiment.

FIG. 16 is a block diagram of a BS 1600, according to an embodiment. Referring to FIG. 16, the BS 1600 may include a transceiver 1610, a processor 1620, and a memory 1630. According to the grant-free UL data channel transmission method and DL control information transmission method for supporting NOMA in a 5G communication system corresponding to the aforementioned embodiments, the transceiver 1610, processor 1620, and memory 1630 of the BS 1600 may be operated. The elements of the BS 1600 is not, however, limited thereto. In another embodiment, the BS 1600 may include more or fewer elements than described above. In addition, in a special occasion, the transceiver 1610, processor 1620, and memory 1630 may be implemented in a single chip. The transceiver 1610 may include a transmitter and a receiver in another embodiment. The transceiver 1610 may transmit or receive signals to or from a UE. The signals may include control information and data. For this, the transceiver 1610 may include an RF transmitter for up-converting the frequency of a signal to be transmitted and amplifying the signal and an RF receiver for low-noise amplifying a received signal and down-converting the frequency of the received signal. In addition, the transceiver 1610 may receive a signal on a wireless channel and output the signal to the processor 1620, or transmit a signal output from the processor 1620 on a wireless channel.

The processor 1620 may control a series of processes for the BS 1600 to be operated according to the embodiments of the disclosure. For example, the processor 1620 may differently control a grant-free based transmission method for NOMA, a grant-free based transmission resource configuration method, a method of monitoring and receiving UL data in a portion of the grant-free transmission resource, a UL control information reception method, a DMRS reception method, etc., according to embodiments of the disclosure.

The memory 1630 may store control information such as information about MA signature configuration determined by the BS 1600 or data, and have sectors for storing data required to control the processor 1620 and data that occurs in the control operation of the processor 1620.

Several embodiments have been described above, but a person of ordinary skill in the art will understand and appreciate that various modifications can be made without departing the scope of the present disclosure. Thus, it will be apparent to those of ordinary skill in the art that the disclosure is not limited to the embodiments described, which have been provided only for illustrative purposes. Furthermore, the embodiments may be operated by being combined with one another if necessary.

The invention claimed is:

1. A method of transmitting or receiving signals by a first user equipment (UE) in a wireless communication system, the method comprising:
   receiving information about a resource for uplink (UL) control information transmission and a multiple access (MA) signature configuration;
   determining, based on the resource for the UL control information transmission, whether the resource allocated for the UL control information transmission overlaps a resource allocated for UL data transmission in time;
   determining whether to perform transmission in orthogonal multiple access (OMA) or non-orthogonal multiple access (NOMA) based on the received information when it is determined that the resource allocated for the UL control information transmission overlaps the resource allocated for the UL data transmission in time;
   determining whether to multiplex the UL control information based on a priority of information included in the UL control information, if it is determined to perform transmission in NOMA; and
   if it is determined to multiplex the UL control information, multiplexing the UL control information with UL data based on the information about the MA signature configuration and transmitting a result of the multiplexing, as a second UE transmits UL control information of the second UE on the resource for the UL control information of the first UE without multiplexing the UL control information of the second UE with the UL data of the second UE.

2. The method of claim 1, wherein the transmitting comprises configuring different MA signatures for the UL data and the UL control information based on the information about the MA signature configuration.

3. The method of claim 1, further comprising:
   selecting one of the UL data and the UL control information based on at least one of priority information and a type of the UL control information received via higher layer signaling or L1 signaling, when the UL data and the UL control information are not multiplexed if it is determined not to multiplex the UL control information; and
   transmitting one of the UL data and the UL control information on the overlapping resource, based on the selecting.

4. The method of claim 1, wherein the receiving comprises:
   receiving OMA resource information for HARQ-ACK reception; and
   transmitting HARQ-ACK on a specified resource based on the received OMA resource information when the multiplexing is performed when the resource allocated for the UL control information and the resource allocated for the UL data overlap each other in time.

5. The method of claim 1, wherein determining whether to multiplex the UL control information comprises:
   determining not to multiplex the UL control information in case that the UL control information includes a HARQ-ACK.

6. A method of transmitting or receiving signals by a base station (BS) in a wireless communication system, the method comprising:
   transmitting, to a first user equipment (UE) and a second UE, information about a resource for uplink (UL) control information transmission and multiple access (MA) signature configuration;
   determining whether UL control information and UL data received from the UEs have been multiplexed in non-orthogonal multiple access (NOMA); and
   decoding at least one of the UL control information and the UL data in signals received from the UEs, based on a result of the determining,
   wherein the UL control information and the UL data received are multiplexed based on a priority of information included in the UL control information, and
   wherein the BS determines that the first UE has multiplexed the UL control information with the UL data in the resource as the second UE has not multiplexed UL control information of the second UE with the UL data of the second UE in the resource.

7. The method of claim 6, further comprising configuring a particular MA signature for the UL control information or configuring a MA signature pool for UL data transmission to be different from a MA signature pool for UL control information transmission, when a MA signature is configured to be randomly selected for UL data transmission of the UE.

8. The method of claim 6, wherein the transmitting comprises transmitting, via higher layer signaling or L1 signaling, information about UL control information or UL data to be transmitted preferentially, when resources on which the UL control information and the UL data are transmitted overlap each other.

9. A first user equipment (UE) for transmitting or receiving signals in a wireless communication system, the UE comprising:
   a transceiver;
   a memory storing one or more instructions; and
   at least one processor configured to execute the one or more instructions stored in the memory,
   wherein the at least one processor is configured to execute the one or more instructions to:
   control the transceiver to receive information about a resource for uplink (UL) control information transmission and MA signature configuration,
   determine based on the resource for UL control information transmission whether the resource allocated for the UL control information transmission overlaps a resource allocated for UL data transmission,
   determine whether to perform transmission in orthogonal multiple access (OMA) or non-orthogonal multiple access (NOMA) based on the received information when it is determined that the resource allocated for the UL control information transmission overlaps the resource allocated for the UL data transmission in time;
   determine whether to multiplex the UL control information based on a priority of information included in the UL control information, if it is determined to perform transmission in NOMA, and
   if it is determined to multiplex the UL control information, control the transceiver to multiplex the UL control information with the UL data based on the information about the MA signature configuration and transmit a result of the multiplexing, based on the determining, as a second UE transmits UL control information of the second UE on the resource for the UL control information of the first UE without multiplexing the UL control information of the second UE with the UL data of the second UE.

10. The UE of claim 9, wherein the at least one processor is configured to execute the one or more instructions to configure different MA signatures for the UL data and the UL control information based on the information about the MA signature configuration.

11. The UE of claim 9, wherein the at least one processor is configured to execute the one or more instructions to:
select one of the UL data and the UL control information based on at least one of priority information and a type of the UL control information received via higher layer signaling or L1 signaling, when the UL data and the UL control information are not multiplexed if it is determined not to multiplex the UL control information, and
control the transceiver to transmit one of the UL data and the UL control information on the overlapping resource, based on the selecting.

12. The UE of claim 9, wherein the at least one processor is configured to execute the one or more instructions to control the transceiver to receive OMA resource information for HARQ-ACK reception and transmit HARQ-ACK on a specified resource based on the received OMA resource information when the multiplexing is performed when the resource allocated for the UL control information and the resource allocated for the UL data overlap each other.

13. The first UE of claim 9, wherein the at least one processor is further configured to execute the one or more instructions to:
determine not to multiplex the UL control information in case that the UL control information includes a HARQ-ACK.

14. A base station (BS) for transmitting or receiving signals in a wireless communication system, the BS comprising:
a transceiver;
a memory storing one or more instructions; and
at least one processor configured to execute the one or more instructions stored in the memory,
wherein the at least one processor is configured to execute the one or more instructions to:
control the transceiver to transmit, to a first user equipment (UE) and a second UE, information about a resource for uplink (UL) control information transmission and multiple access (MA) signature configuration,
determine whether UL control information and uplink data received from the UEs have been multiplexed in non-orthogonal multiple access (NOMA), and
decode at least one of the UL control information and the UL data in signals received from the UEs, based on a result of the determining,
wherein the UL control information and the UL data received are multiplexed based on a priority of information included in the UL control information, and
wherein the BS determines that the first UE has multiplexed the UL control information with the UL data in the resource as the second UE has not multiplexed UL control information of the second UE with the UL data of the second UE in the resource.

15. The BS of claim 14, wherein the at least one processor is configured to execute the one or more instructions to configure a particular MA signature for the UL control information or configure a MA signature pool for UL data transmission to be different from a MA signature pool for UL control information, when an MA signature is configured to be randomly selected for UL data transmission of the UE.

16. The BS of claim 14, wherein the at least one processor is configured to execute the one or more instructions to control the transceiver to transmit, via higher layer signaling or L1 signaling, information about UL control information or UL data to be transmitted preferentially, when resources on which the UL control information and the UL data are transmitted overlap each other in time.

17. The BS of claim 14, wherein the at least one processor is configured to execute the one or more instructions to control the transceiver to transmit OMA resource information for HARQ-ACK reception and receive HARQ-ACK on a specified resource configured based on the received OMA resource information when the multiplexing is performed when the resource allocated for the UL control information and the resource allocated for the UL data overlap each other in time.

* * * * *